US010001878B2

(12) United States Patent
Wood et al.

(10) Patent No.: US 10,001,878 B2
(45) Date of Patent: Jun. 19, 2018

(54) METHOD AND DEVICE FOR DETECTING FASCIA DAMAGE AND REPAIRING THE SAME

(71) Applicant: Motorola Mobility LLC, Chicago, IL (US)

(72) Inventors: Charles David Wood, Highland Park, IL (US); Phillip A Green, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days. days.

(21) Appl. No.: 15/015,242

(22) Filed: Feb. 4, 2016

(65) Prior Publication Data

US 2017/0228094 A1 Aug. 10, 2017

(51) Int. Cl.
*G06F 3/041* (2006.01)
*G06F 3/044* (2006.01)
(Continued)

(52) U.S. Cl.
CPC ............ *G06F 3/0418* (2013.01); *B29C 35/02* (2013.01); *B29C 35/12* (2013.01); *B29C 73/24* (2013.01); *B29C 73/34* (2013.01); *G06F 3/044* (2013.01); *G06F 3/0412* (2013.01); *B29C 2035/0211* (2013.01); *B29K 2075/00* (2013.01);
(Continued)

(58) Field of Classification Search
CPC ...... G06F 3/0418; G06F 3/0412; G06F 3/044; G06F 2203/04111; B29C 35/12; B29C 73/24; B29C 73/34; B29C 35/02; B29C 2035/0211; H01C 7/022; B01L 7/525; C08G 59/5006; B32B 27/40; B01F 13/0006; B29K 2075/00; B29L 2031/3475; B29L 2031/3437
See application file for complete search history.

(56) References Cited

U.S. PATENT DOCUMENTS 4,151,401 A * 4/1979 Van Bokestal ........ H01C 7/022
219/222
2003/0071832 A1 4/2003 Branson
(Continued)

FOREIGN PATENT DOCUMENTS

EP 2506134 A2 10/2012
JP H0695802 A 4/1994
(Continued)

OTHER PUBLICATIONS

Jun Jiang, et al., "Method and Device for Detecting Display Damage and Reconfiguring Presentation Data dn Actuation Elements", U.S. Appl. No. 14/030,241, filed Sep. 18, 2013.
(Continued)

*Primary Examiner* — Richard Hong
(74) *Attorney, Agent, or Firm* — Philip H. Burrus, IV

(57) ABSTRACT

An electronic device includes a fascia manufactured from a shape memory polymer. One or more thermal elements can be disposed adjacent to the fascia or integrated into the fascia. One or more processors can be operable with the one or more thermal elements to detect deformation along at least a portion of the fascia and cause the one or more thermal elements to selectively apply heat to the shape memory polymer along at least a portion of the fascia to reverse at least some of the deformation.

20 Claims, 16 Drawing Sheets

(51) Int. Cl.
*B29C 35/12* (2006.01)
*B29C 73/24* (2006.01)
*B29C 73/34* (2006.01)
*B29C 35/02* (2006.01)
*B29K 75/00* (2006.01)
*B29L 31/34* (2006.01)

(52) U.S. Cl.
CPC ............ *B29L 2031/3437* (2013.01); *B29L 2031/3475* (2013.01); *G06F 2203/04111* (2013.01)

(56) References Cited

U.S. PATENT DOCUMENTS

| | | | |
|---|---|---|---|
| 2005/0077286 A1* | 4/2005 | McFadden | B01F 13/0006 219/494 |
| 2009/0061489 A1* | 3/2009 | Hanagata | B01L 7/525 435/91.2 |
| 2009/0237374 A1 | 9/2009 | Li et al. | |
| 2011/0050617 A1 | 3/2011 | Murphy et al. | |
| 2011/0227836 A1 | 9/2011 | Li et al. | |
| 2012/0136125 A1* | 5/2012 | Rousseau | C08G 59/5006 525/523 |
| 2016/0221316 A1* | 8/2016 | Yairi | B32B 27/40 |

FOREIGN PATENT DOCUMENTS

| | | |
|---|---|---|
| JP | 2009119931 A | 6/2009 |
| WO | 2008147637 A1 | 12/2008 |

OTHER PUBLICATIONS

"moto shattershield", Moto Shattershield—Phone Display Protection; https://www.motorola.com/us/products/moto-shattershield; Unknown publication date but believed to be prior to filing of present application,.

"Transparent Heaters", Optical Filters USA; http://www.opticalfiltersusa.com/transparent-heaters.html; Unknown Publication date but believed to be prior to filing of present application.,.

Diaz, Jesus, "Pocket Heat App Turns your iPhone into a Hand Radiator", Published at https://gizmodo.com/5439589/pocket-heat-app-turns-your-iphone-into-a-hand-radiator; Published Jan. 4, 2010,.

Heatron, "Product Website", Clearview Transparent LCD Screen Heater; https://www.heatron.com/products/details/clearview-transparent-heater/; Unknown publication date but believed to be prior to filing of present application,.

Purcher, Jack, "LG Invents an Advanced Flexible Display and Smartphone Body that uses a new Shape Memory Alloy", Posted on Patently Mobile—www.patentlymobile.com; Feb. 5, 2014,.

Sparkfun, "Product Website", Sparkfun Heating Pad; SparkFun Electronics—COM-11289; https://www.sparkfun.com/products/11289; Unknown publication date but believed to be prior to filing of present application,.

Xie, Tao et al., "Facile Tailoring of Thermal Transition Temperatues of Epoxy Shape Memory Polymers", Published by Elsevier; Available Feb. 28, 2009; www.elseview.com/locate/polymer,.

Xie, Tao, "Recent Advances in Polyer Shape Memory", Published Oct. 13, 2011; vol. 52, Issue 22; pp. 4985-5000; Available online at http://www.sciencedirect.com/science/article/pii/S0032386111006513,.

Xie, Tao, "Recent Advances in Polymer Shape Memory", Feature Article Published by Elsevier Ltd.; Available Aug. 10, 2011; www.elsevier.com/locate/polymer,.

Zagg, "Product Website", InvisibleShield—Screen Protector by Zagg; https://www.zagg.com/us/en_us/invisibleshield; Unknown publication date but believed to be prior to filing of present application,.

* cited by examiner

METHOD AND DEVICE FOR DETECTING FASCIA DAMAGE AND REPAIRING THE SAME

BACKGROUND

Technical Field

This disclosure relates generally to electronic devices, and more particularly to user input elements for electronic devices.

Background Art

"Intelligent" portable electronic devices, such as smart phones, tablet computers, and the like, are becoming increasingly powerful computational tools. Moreover, these devices are becoming more prevalent in today's society. For example, not too long ago a mobile telephone was a simplistic device with a twelve-key keypad that only made telephone calls. Today, "smart" phones, tablet computers, personal digital assistants, and other portable electronic devices not only make telephone calls, but also manage address books, maintain calendars, play music and videos, display pictures, and surf the web.

As the capabilities of these electronic devices have progressed, so too have their user interfaces. Prior art physical keypads having a limited number of keys have given way to sophisticated user input devices such as touch sensitive displays. Touch sensitive displays include sensors for detecting the presence of an object such as a finger or stylus when it is adjacent to the display. By placing the object on the touch sensitive surface, the user can manipulate and control the electronic device, and in many cases without the need for a physical keypad.

One drawback to touch sensitive displays is that they can be damaged. Many displays or surface layers of modern electronic devices are manufactured from glass or plastic. Either of these materials is susceptible to deformation such as scratching, breakage, or bending. Even the most robust materials like thermally tempered glass can suffer deformation if the device is dropped or if a sharp object contacts the display with the necessary amount of force. Once the display is damaged, the electronic device is often considered by the user to be unusable due to the fact that the primary user input has become compromised. It would be advantageous to have a more robust electronic device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

DETAILED DESCRIPTION OF THE DISCLOSURE

Figure 1:
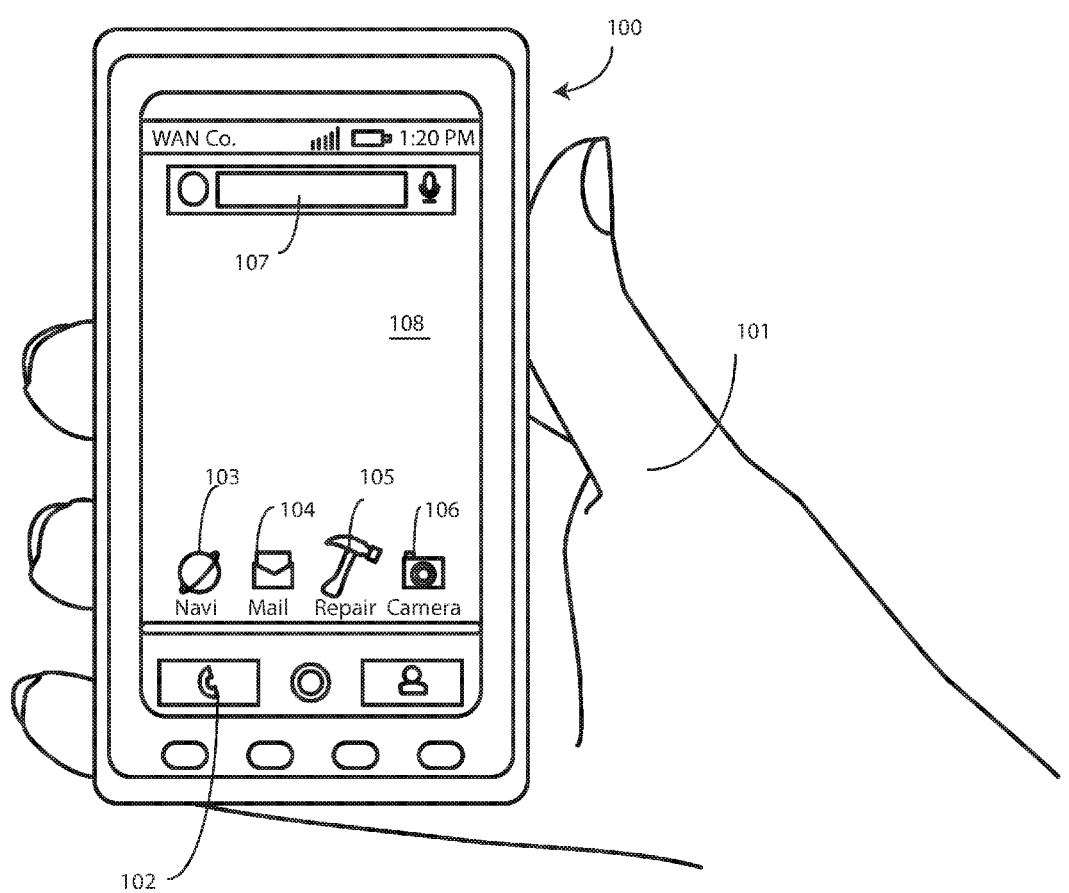
FIG. 1 illustrates one explanatory electronic device in accordance with one or more embodiments of the disclosure.

Before describing in detail embodiments that are in accordance with the present disclosure, it should be observed that the embodiments reside primarily in combinations of method steps and apparatus components related to detecting deformation along at least a portion of a fascia comprising a shape memory polymer, and then selectively applying heat along at least a portion of the fascia to reverse at least a portion of the deformation. Any process descriptions or blocks in flow charts should be understood as representing modules, segments, or portions of code that include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of the method steps of detecting and at least partially reversing deformation along a fascia of an electronic device as described herein. The non-processor circuits may include, but are not limited to, processing circuits, driver circuits, signal drivers, clock circuits, power source circuits, and executable code stored in a computer readable medium such as a memory device. As such, these functions may be interpreted as steps of a method to perform the detection and correction of fascia deformation. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device comprising a fascia manufactured from a polymer. In one or more embodiments, the fascia is manufactured from a "shape memory polymer." A shape memory polymer is a material that is able to repair large strains. Shape memory polymers are able to undergo large deformations and then recover that deformation through thermal cycling.

Shape memory polymers are stimuli-responsive materials, in that a corrective response can be applied as a result to a stimulus. While different stimuli can be applied to trigger the response, in many cases the stimulus is the application of heat, which leads to an increase in the temperature of the material. Moreover, in many applications, shape memory polymers can be deformed and subsequently fixed into a temporary shape. For example, the surface of a shape memory polymer may be scratched, i.e., deformed from a smooth surface to a scratched surface. In ordinary conditions, the shape memory polymer would remain stable in the deformed state and, accordingly, would remain scratched. However, when the shape memory polymer is exposed to an external stimulus, it yields a response by returning to its original, or default, state. Thus, by applying a stimulus the scratched shape memory polymer can reverse some or all of the deformation and return to its original condition defining a smooth surface. This ability to respond to a stimulus to return to an original state is referred to as the "polymer shape memory effect."

In one or more embodiments, an electronic device includes a fascia comprising a shape memory polymer. One or more thermal elements disposed adjacent to the fascia, and one or more processors are operable with the one or more thermal elements. In one or more embodiments the one or more processors to detect deformation along at least a portion of the fascia. In some embodiments, this detection occurs automatically. In other embodiments, user input can be received to demarcate the portion of the fascia suffering from the deformation. Regardless of the method used, in one or more embodiments the one or more processors can then cause the one or more thermal elements to selectively apply heat to the shape memory polymer along the at least a portion to reverse at least some of the deformation.

In one or more embodiments, the one or more thermal elements are optically transparent resistive heating elements. These optically transparent resistive heating elements can be configured in a variety of ways as will be described below. For example, in one embodiment the optically transparent resistive heating elements can be disposed along a surface of the fascia. In another embodiment, the optically transparent resistive heating elements can be sandwiched between two layers of fascia material. In yet another embodiment, the optically transparent resistive heating elements can be disposed along a substrate, such as a polycarbonate or acrylic backer layer, that is adjacent to the fascia.

Regardless of configuration, in one or more embodiments the optically transparent resistive heating elements are operable to selectively warm the fascia from the interior of the electronic device or the backside of the fascia. In one or more embodiments, the heat is selectively applied only to the portion of the fascia suffering from the deformation, thereby providing distinct advantages over any global heating methodology such as heating the device in an oven, using a hair dryer, or leaving the electronic device in the sun. The selective application of heat by the optically transparent resistive heating elements allows thermal cycling to be controlled so as to target the locally damaged regions that are deformed. The configuration of the optically transparent resistive heating elements can be optimized to ensure optimal deformation recovery and overall structural response.

In one or more embodiments, the one or more processors cause the optically transparent resistive heating elements to begin reversing deformation automatically. In another embodiment, a user can selectively cause the optically transparent resistive heating elements to apply heat by launching a fascia restoration application. In one embodiment, the fascia restoration application can prompt the user to mark the locations where the fascia is damaged by touching the fascia. After the damaged location is identified or otherwise demarcated, the one or more processors can cause the application of a voltage across, or current through, selective optically transparent resistive heating elements to apply heat around the deformation for at least a predefined period of time.

In other embodiments, a predetermined condition may be required to cause the optically transparent resistive heating elements to apply heat. Illustrating by example, in one or more embodiments the optically transparent resistive heating elements do not apply heat until the electronic device is coupled to a charger and the electronic device is in a low power or sleep mode. This would allow, for example, the deformation to be repaired overnight while the electronic device was coupled to a power source so as not to preclude usage of the electronic device or to unnecessarily deplete the battery. Research demonstrates that the heat applied by the optically transparent resistive heating elements can be tuned to repair damage such as scratches, bends, and even breakage within temperature ranges that do not adversely affect a user experience with the electronic device. For instance, where the optically transparent resistive heating elements have an impedance of between 200 and 1000 ohms, a current of roughly 5.25 milliamps can elevate the temperature of roughly a 100 millimeter-square area of a fascia from am ambient temperature of 25 degrees centigrade to 60 degrees centigrade in between two and ten minutes. Illustrating by example, in one test simulation, a 100 millimeter-square area of fascia was configured with resistive heating elements having an impedance of between 400 and 800 ohms. When these resistive heating elements were driven by a 5.25 milliamp current from a 4.2 volt lithium cell, the area of fascia rose from ambient to 60 degrees centigrade in approximately ten minutes.

Advantageously, embodiments of the disclosure provide a fascia or lens for an electronic device with self-healing properties. Optically transparent resistive heating elements allow cycling and regeneration of the fascia or lens to repair or reverse deformation. In one or more embodiments, the optically transparent resistive heating elements are able to selectively apply heat to localized areas along the fascia or lens. In some embodiments, a user can even demarcate via touch or other techniques an area of the fascia or lens is deformed and in need of repair. The optically transparent resistive heating elements can be configured as indium tin oxide electrodes, configured in a matrix in one embodiment, or alternatively can take the form of other devices such as capacitive touch film that is integral or external to the fascia or lens. In one or more embodiments, an "overnight restoration mode" allows fascia recover when the electronic device is being charged overnight.

Turning now to FIG. 1, illustrated therein is one embodiment of an electronic device 100 configured in accordance with one or more embodiments of the disclosure. The explanatory electronic device 100 of FIG. 1 is shown as a smart phone for illustrative purposes. However, it will be obvious to those of ordinary skill in the art having the benefit of this disclosure that other electronic devices may be substituted for the explanatory smart phone of FIG. 1. For example, the electronic device 100 may be configured as a palm-top computer, a tablet computer, a gaming device, wearable computer, a media player, or other device.

A user 101 is holding the electronic device 100. The operating system environment, which is configured as executable code operating on one or more processors or control circuits of the electronic device 100, has associated therewith various applications or "apps." Examples of such applications shown in FIG. 1 include a cellular telephone application 102 for making voice telephone calls, a navigation application 103 configured to provide mapping and navigation information to the user on the display 108 of the electronic device 100, an electronic mail application 104 configured to send and receive electronic mail, and a camera application 106 configured to capture still (and optionally video) images. A "screen healing" application 105, which will be explained in more detail below with reference to FIGS. 12-15, is provided for reversing at least some deformation that may occur to the fascia disposed above the display 108. An Internet and/or local search application 107 is also provided. The Internet and/or local search application 107 allows a user to search the web or the local device for items like contacts, lists, songs, media, desirous information on persons, places, and things, and so forth. These applications are illustrative only, as others will be obvious to one of ordinary skill in the art having the benefit of this disclosure.

Figure 2:
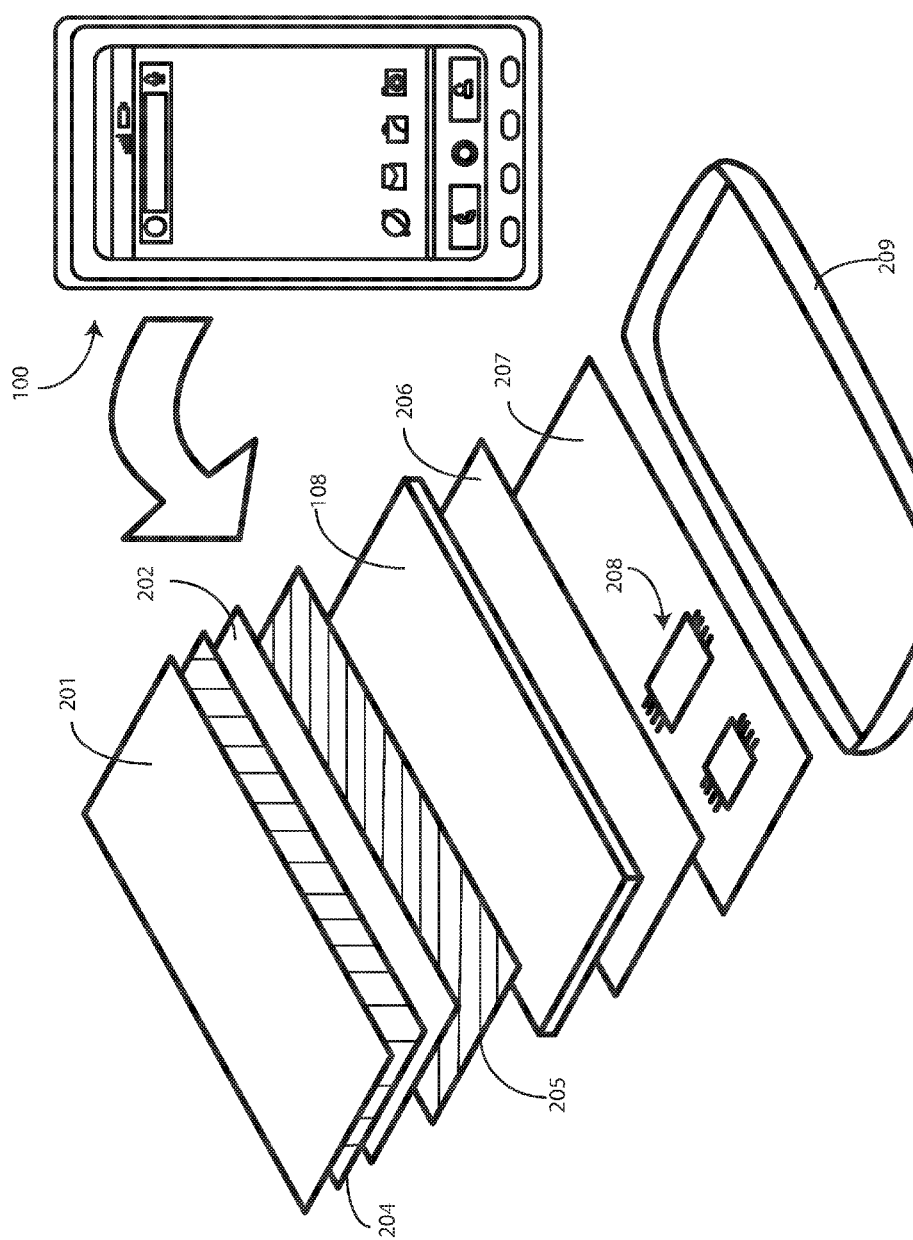
FIG. 2 illustrates an exploded view of one explanatory electronic device in accordance with one or more embodiments of the disclosure.

Turning now to FIG. 2, illustrated therein is an exploded view of one embodiment of the electronic device 100. Some of the elements shown in FIG. 2 will be explained in further detail with reference to subsequent figures. However, FIG. 2 provides an exploded view to illustrate one explanatory mechanical "stack-up" of how the elements can be arranged within a housing 209 in one embodiment. In this illustrative embodiment, the electronic device 100 includes a display 108 that is touch-sensitive. The illustrative display 108 of FIG. 2 employs a capacitive touch sensor to provide its touch-sensing function. However, it will be clear to those of ordinary skill in the art having the benefit of this disclosure that other touch sensing technologies can be substituted for the capacitive sensor shown in FIG. 2.

Starting from the top of the electronic device 100, a fascia 201 defines a front major face of the electronic device. As used herein, a "fascia" is a covering, which may or may not be detachable, for an electronic device like a mobile telephone. In one or more embodiments, the fascia 201 spans at least a portion of the electronic device 100. In one embodiment, the fascia member will span a major face—or a portion thereof—of the electronic device 100. The fascia 201 may include a ultra-violet barrier. Such a barrier is useful both in improving the visibility of display 108 and in protecting internal components of the electronic device 100.

In one or more embodiments, the fascia 201 is manufactured from a shape memory polymer. In one embodiment, the shape memory polymer of the fascia 201 is a shape memory polyurethane due to its relatively low cost, availability, and ease of structural tuning for recovery in response to a stimulus. Additionally, polyurethane allows for additional features such as biodegradability due to its polymeric nature. However, other shape memory polymers suitable for use with embodiments of the disclosure will be obvious to those of ordinary skill in the art having the benefit of this disclosure.

In one or more embodiments, the shape memory polymer comprises molecular chains that adopt physical conformations having highest entropy states. Said differently, the molecular chains of the shape memory polymer will tend to remain in states that are thermodynamically stable. However, when heated above a predefined threshold known as a shape memory transition temperature, the molecular chains become activated. The molecular chains can then change their form factor by adopting macroscopic shape changes having lower entropy states. Once the temperature of the shape memory polymer falls below the shape memory transition temperature, these physically different form factors become fixed kinetically due to deactivation of the molecular chains. When the molecular chains are again heated above the shape memory transition temperature, they again become activated and return to states of higher entropy, which returns the physical form factor to its original or permanent state. Thus, when used as the fascia 201 of the electronic device 100, a shape memory polymer having an original, or permanent, state that is non-deformed can be returned to that original, non-deformed state when the molecular chains are heated above the shape memory transition temperature.

It should be noted that shape memory polymers do not need to be heated to change to a deformed state from the original or permanent state. To the contrary, a deformation force can be applied to a shape memory polymer in the absence of heat, i.e., when the molecular chains are inactive. This is known as "plastic deformation" of the shape memory polymer. This deformation can be partially or entirely reversed when the shape memory polymer is heated above the shape memory transition temperature. This is known as the "reversible plasticity shape memory effect," and is the feature of the shape memory polymer that lends itself primarily to embodiments of the disclosure. For example, if the fascia 201 undergoes a deformation such as being scratched, being cracked or broken, or being bent, this deformation can be recovered by heating the fascia 201—or at least the portion of the fascia 201 that is deformed—above the shape memory transition temperature. This is known as the shape memory polymer "self-healing effect" and has been demonstrated to reverse indents, scratches, and other deformations in practice.

The self-healing effect has been shown to completely reverse scratches and indentations, and to at least partially reverse cracks and breakage. This is true because scratching results in more tightly compressed molecular chains, which is a change in entropy state. By contrast, a break means separation of the molecular chains, which requires material flow for complete healing. However, partial healing of cracks and breakage is possible with the self-healing effect. Accordingly, embodiments of the disclosure can be used to reverse at least some of the deformation occurring along the fascia 201, whether it be scratches along the fascia 201, breakage of the fascia 201, or bending of the fascia 201.

Where the display 108 is a touch sensitive display, the electronic device 100 can next comprise a capacitive touch sensor 202. The capacitive touch sensor 202 is operable with one or more processors 208 of the electronic device 100 to detect the position at which a user's finger or stylus makes contact with the fascia 201. In this illustrative embodiment, the capacitive touch sensor 202 functions as a touch sensitive user interface that is disposed beneath substantially the entire fascia 201 such that touch input can be received along substantially the entirety of the fascia 201. However, in other embodiments, the capacitive touch sensor 202 may be disposed along only a portion of the fascia 201, such as within a predefined user interface region that does not span the entirety of the fascia 201.

Beneath the capacitive touch sensor 202, where included, is the display 108. In one embodiment, the display 108 is a high-resolution liquid-crystal-diode (LCD) display. However, other technologies can be used, including organic LED displays, LED displays, and so forth. One or more layers of adhesive 204,205 can optionally be used to couple the various components shown in FIG. 2 together in one or more embodiments. An optional backlight 206 can be included where necessary. For example, if the display 108 is an LCD display, the backlight 206 can project light through pixels of the display 108 in low light environments.

A substrate 207 may be disposed beneath the display 108. The substrate 207, which may be a rigid or flexible printed circuit board in one or more embodiments, accommodates the various electronic circuitry of the electronic device 100. For example, one or more processors 208, a display driver circuit, a capacitive sensor circuit, and so forth can be included in the electronic circuitry. Each of the various layers is then disposed within a housing 209 of the electronic device 100.

It should be stated that the various elements of the electronic device 100 shown in FIG. 2 are illustrative only, and that other configurations will be obvious to those of ordinary skill in the art having the benefit of this disclosure. For example, some configurations will include a capacitive touch sensor 202, while others will not. Additional layers or fewer layers can be included without departing from the spirit and scope of this disclosure. For example, in some embodiments the electronic device 100 will include an optional haptic layer to provide a pseudo-tactile feedback in response to user actuation of virtual buttons, user actuation targets, or user input controls presented on the display 108 to simulate conventional physical keys by delivering a tactile response to the body of the electronic device.

Figure 3:
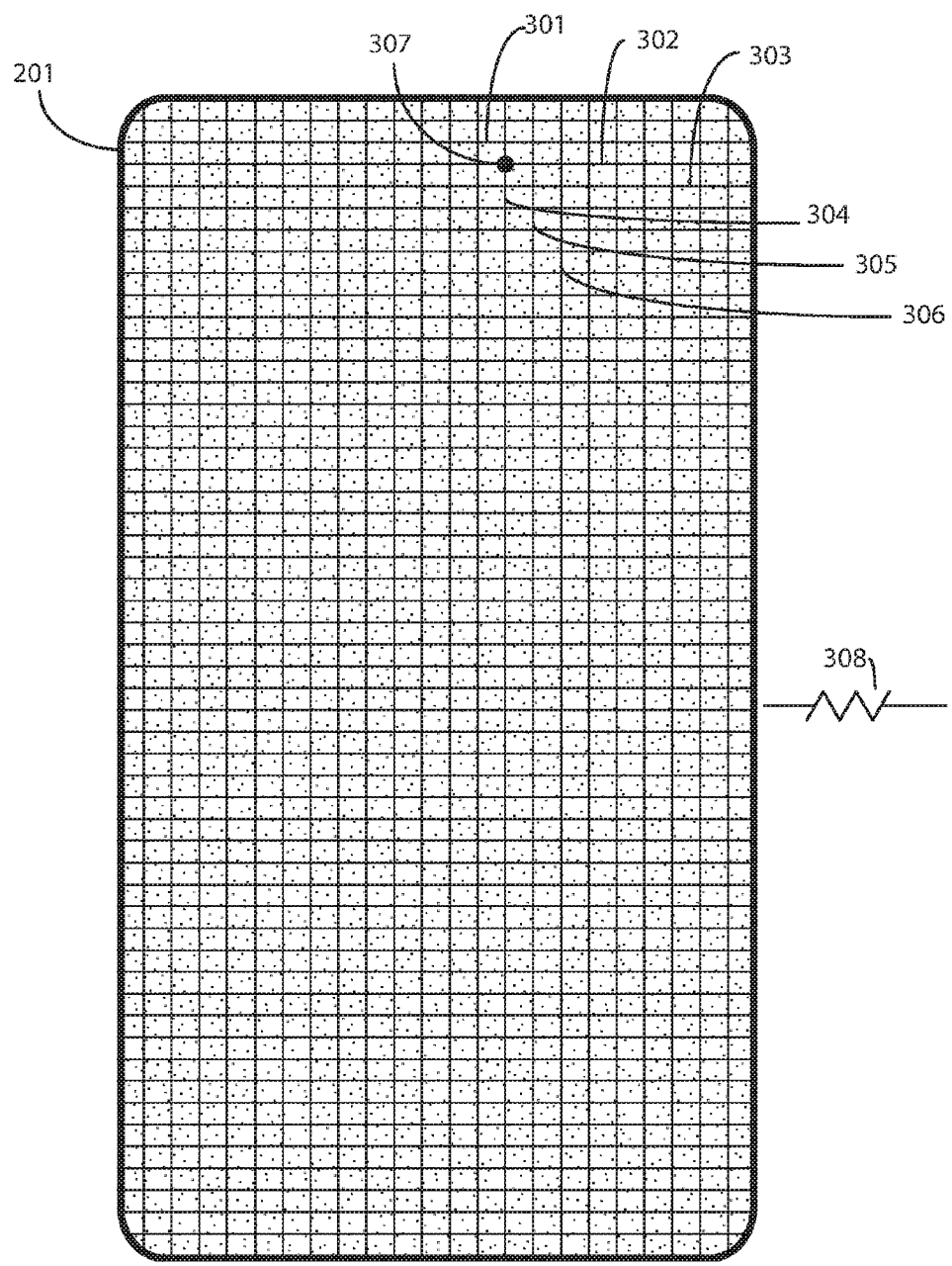
FIG. 3 illustrates one explanatory fascia for an electronic device in accordance with one or more embodiments of the disclosure.

Turning now to FIG. 3, illustrated therein is a more detailed view of one embodiment of the fascia 201. As noted above, in one or more embodiments the fascia 201 is manufactured from a shape memory polymer. In one or more embodiments, one or more thermal elements 301,302,303, 304,305,306 are disposed adjacent to the fascia 201. In this illustrative embodiment, the one or more thermal elements 301,302,303,304,305,306 are disposed along a rear side of the fascia 201. However, embodiments of the disclosure are not so limited. In another embodiment, the one or more thermal elements 301,302,303,304,305,306 may be integrated into the fascia 201 by disposing the one or more thermal elements 301,302,303,304,305,306 between two layers of the shape memory polymer.

In one or more embodiments, the one or more thermal elements 301,302,303,304,305,306 are optically transparent resistive electrodes that are substantially pellucid so that a personc an see through them. For example, in one embodiment optically transparent resistive electrodes can be manufactured by depositing solid indium-tin oxide (In.sub.2 O.sub.3 SnO.sub.2) (ITO) in a desired pattern along the fascia 201. Indium tin oxide is a mixture of indium oxide and tin oxide. In at least some formulations, indium tin oxide is substantially transparent and conductive, and can be deposited with a predefined characteristic impedance. Indium tin oxide can be deposited in thin layers by way of a printing process. Indium tin oxide is well suited for embodiments of the present invention due to its combination of electrical conduction properties and optical transparency. The one or more thermal elements 301,302,303,304,305,306 may be deposited on the fascia 201 in any of a variety of ways, including electron beam evaporation, physical vapor deposition, or other various sputter deposition techniques. Materials other than indium tin oxide may be used to fabricate the one or more thermal elements 301,302,303,304,305,306. For example, in another embodiment the one or more thermal elements 301,302,303,304,305,306 are manufactured from patterned conductive ink. Still other materials will be obvious to those of ordinary skill in the art having the benefit of this disclosure. Moreover, a capacitive touch layer will be described as another material suitable for defining the one or more thermal elements 301,302,303,304,305,306 with reference to FIG. 8 below.

In the illustrative embodiment of FIG. 3, the one or more thermal elements 301,302,303,304,305,306 are disposed as an interlaced matrix. Illustrating by example, thermal elements 301,302,303 run vertically while thermal elements 304,305,306 run horizontally. In one or more embodiments, each of the one or more thermal elements 301,302,303,304, 305,306 is individually addressable. Accordingly, when configured in a matrix, one or more processors (208) operable with the one or more thermal elements 301,302,303,304, 305,306 can address individual thermal elements to cause the one or more thermal elements 301,302,303,304,305,306 to selectively apply heat to the shape memory polymer forming the fascia 201 at specific locations. For example, actuating thermal element 304 and thermal element 304 can selectively apply heat to specific portions 307 of the fascia 201. It should be noted that a matrix is but one type of arrangement for the one or more thermal elements 301,302, 303,304,305,306. Others will be discussed below with reference to FIGS. 5-8. Still others will be obvious to those of ordinary skill in the art having the benefit of this disclosure.

In one or more embodiments, each of the one or more thermal elements 301,302,303,304,305,306 has associated therewith an impedance 308. For example, in one embodiment the impedance 308 is between 200 and 1000 ohms, inclusive. In another embodiment, the impedance 308 is between 400 and 600 ohms, inclusive. Simulations demonstrate that when the impedance 308 is within these ranges, a ten millimeter by ten millimeter square of the fascia 201 can be heated to a temperature of sixty degrees centigrade within a few minutes by driving a current of roughly 100 millamps through the one or more thermal elements 301, 302,303,304,305,306. Where the impedance 300 is about 400 ohms, a current of 100 milliamps can heat a 100 millimeter-square area of the fascia 201 to that temperature in about 600 seconds. While these impedance ranges work well for consumer electronics, other ranges will be obvious to those of ordinary skill in the art having the benefit of this disclosure.

Figure 4:
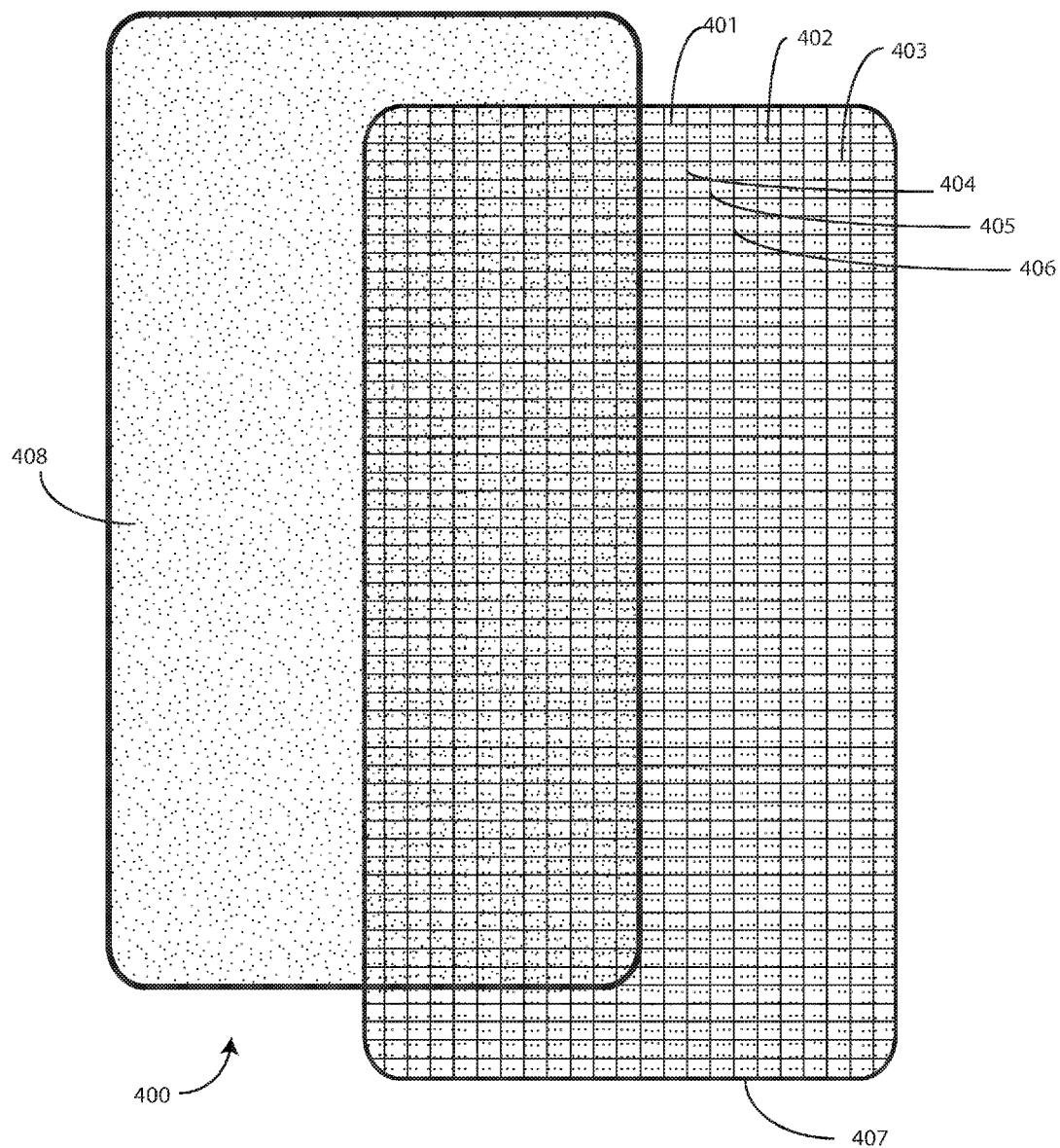
FIG. 4 illustrates another explanatory fascia for an electronic device in accordance with one or more embodiments of the disclosure.

Turning now to FIG. 4, illustrated therein is an alternate embodiment of a fascia 400 in accordance with one or more embodiments of the disclosure. In contrast to the fascia (201) of FIG. 3, which was a unitary fascia, the fascia 400 of FIG. 4 is an assembly.

As shown in the illustrative embodiment of FIG. 4, rather than being disposed along the fascia layer 408 itself, the one or more thermal elements 401,402,403,404,405,406 are disposed along a substrate 407 disposed adjacent to the fascia layer 408. The substrate 407, in one embodiment, is manufactured from a pellucid material such as polycarbonate. Accordingly, in this embodiment, the pellucid substrate 407 is disposed adjacent to the fascia layer 408, with the matrix of optically transparent resistive electrodes defining the one or more thermal elements 401,402,403,404 being disposed along the pellucid substrate 407.

Disposing the one or more thermal elements 401,402,403, 404,405,406 along the substrate 407, rather than on the fascia layer 408, advantageously eliminates the need of passing the fascia layer 408 through the deposition process of the one or more thermal elements 401,402,403,404,405, 406. At the same time, it allows for the one or more thermal elements 401,402,403,404,405,406 to be adjacent to the fascia layer 408 to apply heat as a stimulus to trigger the self-healing effect. One or more layers of adhesive (not shown) can optionally be used to couple the substrate 407 and the fascia layer 408 together in one or more embodiments.

As noted above in the discussion of FIG. 3, a matrix of thermal elements is not the only configuration of arranging the thermal elements in accordance with embodiments of the disclosure. Turning now to FIGS. 5-8, illustrated therein are alternate configurations for the thermal elements. It should be noted that the configurations of FIGS. 5-8 can be formed on a fascia, as described above with reference to FIG. 3, or on a substrate, as described above with reference to FIG. 4. Additionally, other configurations for the thermal elements will be obvious to those of ordinary skill in the art having the benefit of this disclosure.

Figure 5:
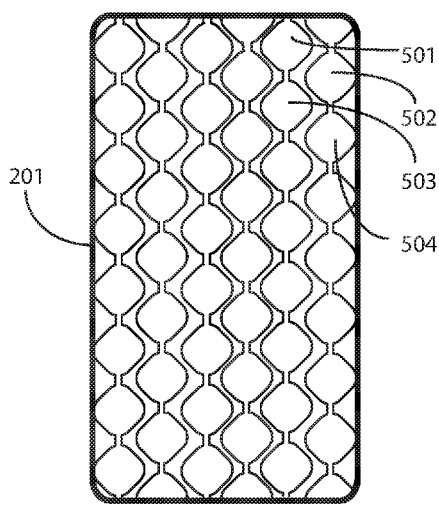
FIG. 5 illustrates another explanatory fascia for an electronic device in accordance with one or more embodiments of the disclosure.

Beginning with FIG. 5, in this embodiment the one or more thermal elements 501,502,503,504 are disposed along the fascia 201 in a side-by-side, alternating elevation, linked island pattern. In this illustrative embodiment, the islands are substantially diagonal in shape. However, embodiments of the disclosure are not so limited. The islands could be circular, ovular, rectangular, triangular, pentagonal, or take other shapes as well.

In this illustrative embodiment, the side-by-side, alternating elevation, linked island pattern is formed by placing strings of linked islands side by side, with adjacent islands differing along the y-axis. Illustrating by example, thermal elements 501,502 are linked as islands in a first chain, while thermal elements 503,504 are linked as islands in a second chain. The height of each chain changes, such that thermal element 501 is higher than adjacent thermal element 502, which is higher than adjacent thermal element 503. This side-by-side, alternating elevation, linked island pattern can be considered to be a staggered adjacent linked island pattern.

In one or more embodiments, one or more processors (208) operable with the one or more thermal elements 501,502,503,504 can address individual thermal elements to cause the one or more thermal elements 501,502,503,504 to selectively apply heat to the shape memory polymer forming the fascia 201 at specific locations. For example, actuating thermal element 501 individually would apply heat to one portion of the fascia 201, while actuating thermal elements 501,502,503,504 collectively would apply heat to another portion of the fascia 201, and so forth.

Figure 6:
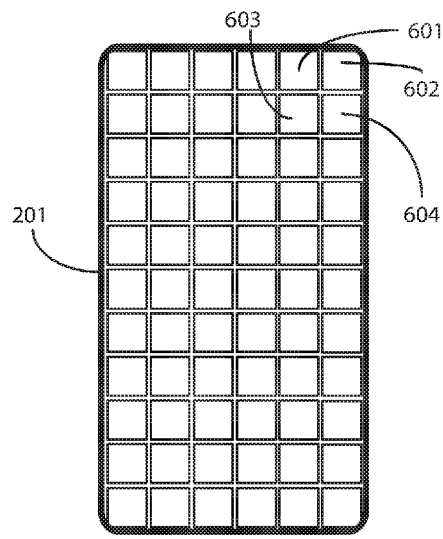
FIG. 6 illustrates yet another explanatory fascia for an electronic device in accordance with one or more embodiments of the disclosure.

Turning now to FIG. 6, illustrated therein is another pattern of thermal elements 601,602,603,604 in accordance with one or more embodiments of the disclosure. As with other embodiments, the of thermal elements 601,602,603, 604 of FIG. 6 can be disposed on a fascia, as described above with reference to FIG. 3, or on a substrate, as described above with reference to FIG. 4.

In the illustrative embodiment of FIG. 4, the one or more thermal elements 601,602,603,604 are disposed in a checkerboard pattern. While the thermal elements 601,602,603, 604 are substantially rectangular, they can take other shapes as noted above. In one or more embodiments, each thermal element 601,602,603,604 can be individually actuated by one or more processors (208) through control lines (not shown) to apply heat to the fascia 201. For example, actuating thermal element 601 individually would apply heat to one portion of the fascia 201, while actuating thermal elements 601,602,503 collectively would apply heat to another L-shaped portion of the fascia 201, and so forth. It should be noted that while the one or more thermal elements (301,302,303,304) of FIG. 3 were interlaced in a matrix, the thermal elements (501,502,503,504) of FIG. 5 and the thermal elements 601,602,603,604 of FIG. 6 are in a matrix but are not interlaced.

Figure 7:
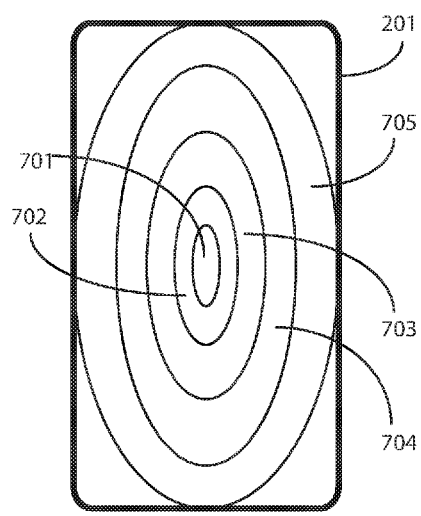
FIG. 7 illustrates still another explanatory fascia for an electronic device in accordance with one or more embodiments of the disclosure.

Turning to FIG. 7, here the one or more thermal elements 701,702,703,704,705 are configured as concentric ovals. The concentric ovals can be disposed on a fascia, as described above with reference to FIG. 3, or on a substrate, as described above with reference to FIG. 4. One or more processors (208) can selectively actuate any one concentric oval independently, thereby applying heat selectively to certain portions of the fascia 201 as previously described.

Figure 8:
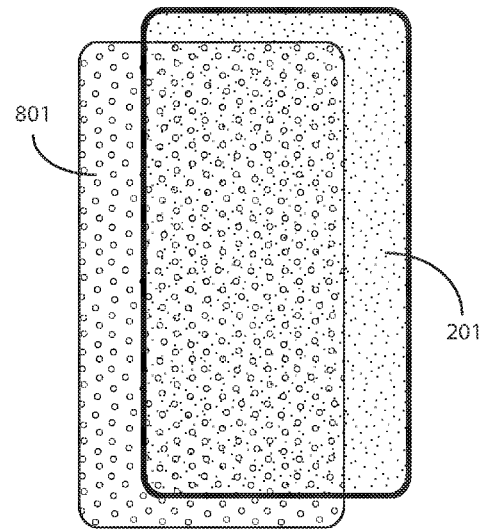
FIG. 8 illustrates another explanatory fascia for an electronic device in accordance with one or more embodiments of the disclosure.

Turning to FIG. 8, in this illustrative embodiment the thermal element 801 is configured as a capacitive touch-sensitive film. In one or more embodiments, capacitive touch sensors can be configured as films. Illustrating by example, in one embodiment a capacitive touch sensor is integrated into a thin film that can be attached to the fascia 201 with an optically clear adhesive. In one or more embodiments, the thin film can be resistive such that one or more processors (208) can apply a voltage across the thin film to apply heat to the fascia 201. It should be noted that the embodiments of FIGS. 4-8 are illustrations of some of the many ways that thermal elements can be configured in accordance with embodiments of the disclosure. Numerous others will be obvious to those of ordinary skill in the art having the benefit of this disclosure.

Figure 9:
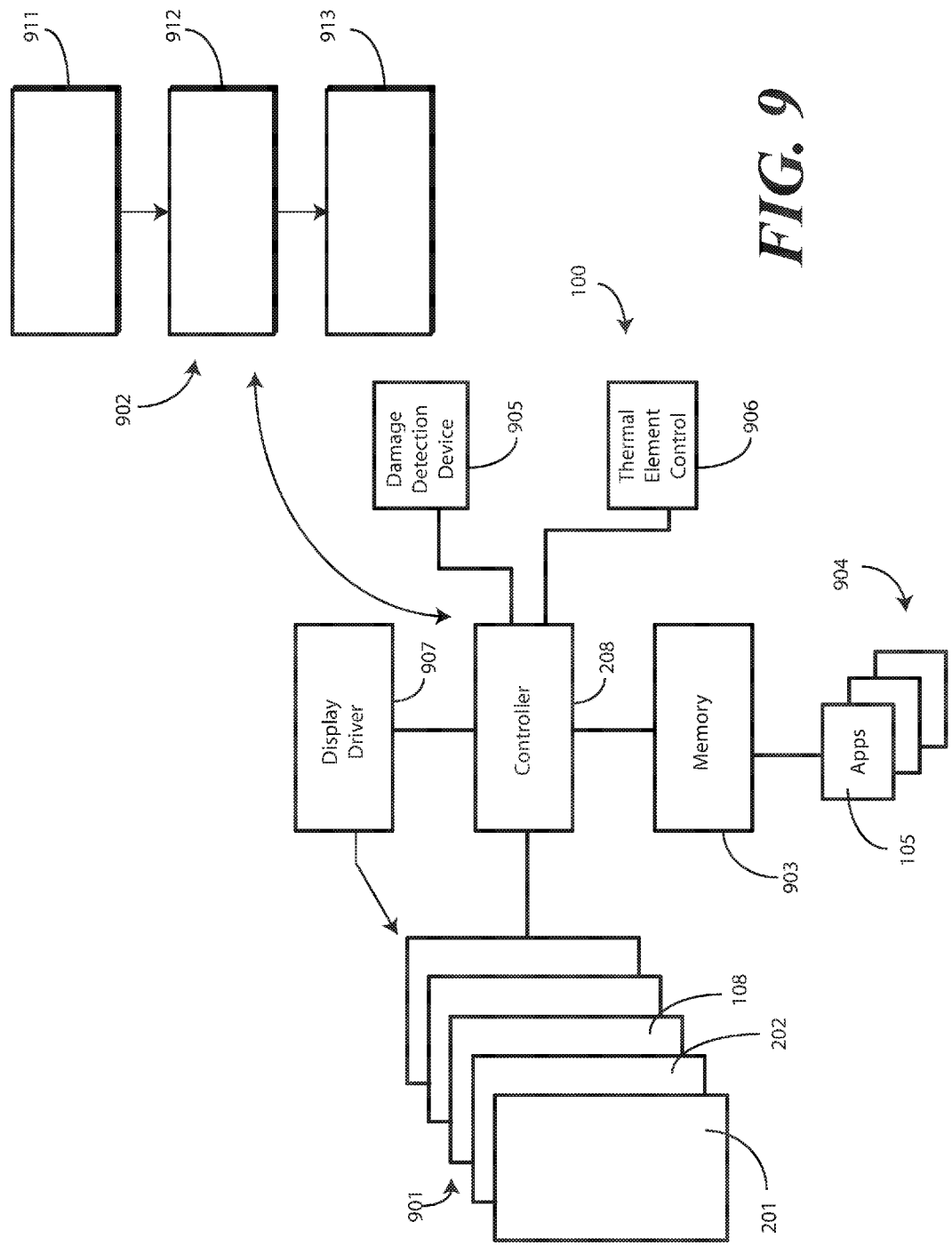
FIG. 9 illustrates a schematic block diagram of one explanatory electronic device in accordance with one or more embodiments of the disclosure.

Turning now to FIG. 9, illustrated therein are various components of one explanatory electronic device 100 configured in accordance with embodiments of the disclosure, with those components shown as a schematic block diagram 900. The schematic block diagram 900 illustrates one embodiment of internal circuitry, software modules, firmware modules, and other components in an electronic device 100 in accordance with embodiments of the disclosure. While this illustrative internal circuitry is directed to a generic electronic device, note that it could be readily adapted to any number of specific devices.

As shown in the schematic block diagram 900, one or more processors 208 are operable with a display assembly 901, which includes a fascia 201 and a touch-sensitive display 108 in this illustrative embodiment. The one or more processors 208 can comprise a microprocessor, programmable logic, application specific integrated circuit device, or other similar device, and is capable of executing program instructions, such as those shown in method 902. The program instructions may be stored either in the one or more processors 208, or in a memory 903 or other computer readable medium operable with the one or more processors 208. The memory 903 can also store executable code corresponding to the various applications 904 that are operable on the electronic device 100, such as those described above with reference to FIG. 1. The one or more processors 208 are configured, in one embodiment, to operate the various functions of the electronic device 100. The one or more processors 208 can execute software or firmware applications stored in memory 903 to provide device functionality.

In one embodiment, the one or more processors 208 are configured to be operable with both a damage detection device 905 and a thermal element control 906. The damage detection device 905 and the thermal element control 906 can be configured as executable code, or alternatively may be configured as hardware, such as in programmable logic or other devices incorporated in, substituted for, or operable with the one or more processors 208. The one or more processors 208, damage detection device 905 and the thermal element control 906 can also be configured to be operable with a display driver 907 to effect and control presentation of information on the display 108.

Turning now to the modules, the damage detection device 905, which is optional, can be configured to detect a damaged portion of the display assembly 901. Generally speaking, the damaged portion will include damage to the fascia 201, as it is the outermost layer. Illustrating by example, the damage detection device 905 can detect one or more of the capacitive plate electrodes of the capacitive touch sensor 202 that are not functioning to detect user input. If, for instance, the fascia 201 is deformed by scratches, drops, hits, or other forces, it is frequently the case that the capacitive plate electrodes of the capacitive touch sensor 202 will become damaged as well. These capacitive plate electrodes can be cut, bent, shorted together, or otherwise rendered inoperable for detecting changes in the electric field between those capacitive plate electrodes. In one or more embodiments, the damage detection device 905 can also be configured to detect what portion(s) of the display 108 are damaged as well. In one or more embodiments, the deformations to the fascia 201 will illustratively be described as including scratches along the fascia 201, breakage of the fascia 201, or bending of the fascia 201. However, it will be clear to those of ordinary skill in the art having the benefit of this disclosure that other types of deformation and/or damage can occur to the fascia 201 as well.

In other embodiments, such as where the damage detection device 905 is omitted, a screen healing application 105 is provided. In one or more embodiments, when the fascia 201 suffers deformation, a user can launch the screen healing application 105 to alter the one or more processors 208 that reversal of at least some of the deformation along the fascia 201 is required. It should be noted that the screen healing application 105 can be included even where the damage detection device 905 is present, as not all deformations of the fascia 201 will damage underlying layers.

Once the one or more processors 208 have detected deformation to the fascia 201 from one or more of the damage detection device 905 or the screen healing application 105, in one or more embodiments the one or more processors 208 are then operable to cause one or more thermal elements 908,909,910 disposed adjacent to the fascia 201 to selectively apply heat to at least a portion of the shape memory polymer of the fascia 201 to reverse at least some of the deformation. Other features can be performed as well. For example, in one embodiment, the one or more processors 208 can receive user input from touch sensitive components of the display assembly 901 or user interface demarcating portion of the fascia 201 that has been deformed. If a user or other object touches the fascia 201 while heat is being applied, in one embodiment the one or more processors 208 can cause the one or more thermal elements 908,909,910 to terminate the application of heat. The one or more processors can also present indicia on the user interface of the display assembly 901 when the one or more thermal elements 908,909,910 selectively apply the heat. Many of these features will be described below with reference to subsequent figures. Other features will be obvious to those of ordinary skill in the art having the benefit of this disclosure.

In one or more embodiments, the one or more processors 208 can be operable with the thermal element control 906 to execute a method 330 configured in accordance with one or more embodiments of the disclosure. Illustrating by example, at step 911, the one or more processors 208 can detect, with one or both of the damage detection device 905 or the screen healing application 105, a deformation along a portion of a fascia 201 of the electronic device 100.

This deformation detection can optionally include detecting a deformation perimeter that circumscribes the deformation along the fascia 201. For example, user input can be receive to demarcate the deformation. Alternatively, the one or more processors 208 may detect individual capacitor plate pairs of the capacitive touch sensor 202 being inoperable. The next closest capacitor plate pairs could then be used to define the perimeter circumscribing the deformation. In another embodiment, the display 108 can be divided into zones to determine which zones are inoperable. The boundaries of the "good" zones can be used to construct a perimeter circumscribing the deformation. Other methods for detecting the deformation perimeter will be obvious to those of ordinary skill in the art having the benefit of this disclosure.

At step 912, the one or more processors 208 can, with the thermal element control 906, cause the one or more thermal elements 908,909,910 to selectively apply heat to the portion to at least partially repair the deformation of the fascia 201. At step 913, the one or more processors 208 can perform other functions, including presenting indicia on the display 108 indicating that the heat is being selectively applied, presenting indicia on the display 108 that the deformation has been repaired, terminating the application of heat if a user touches the fascia 201, and so forth.

Figure 10:
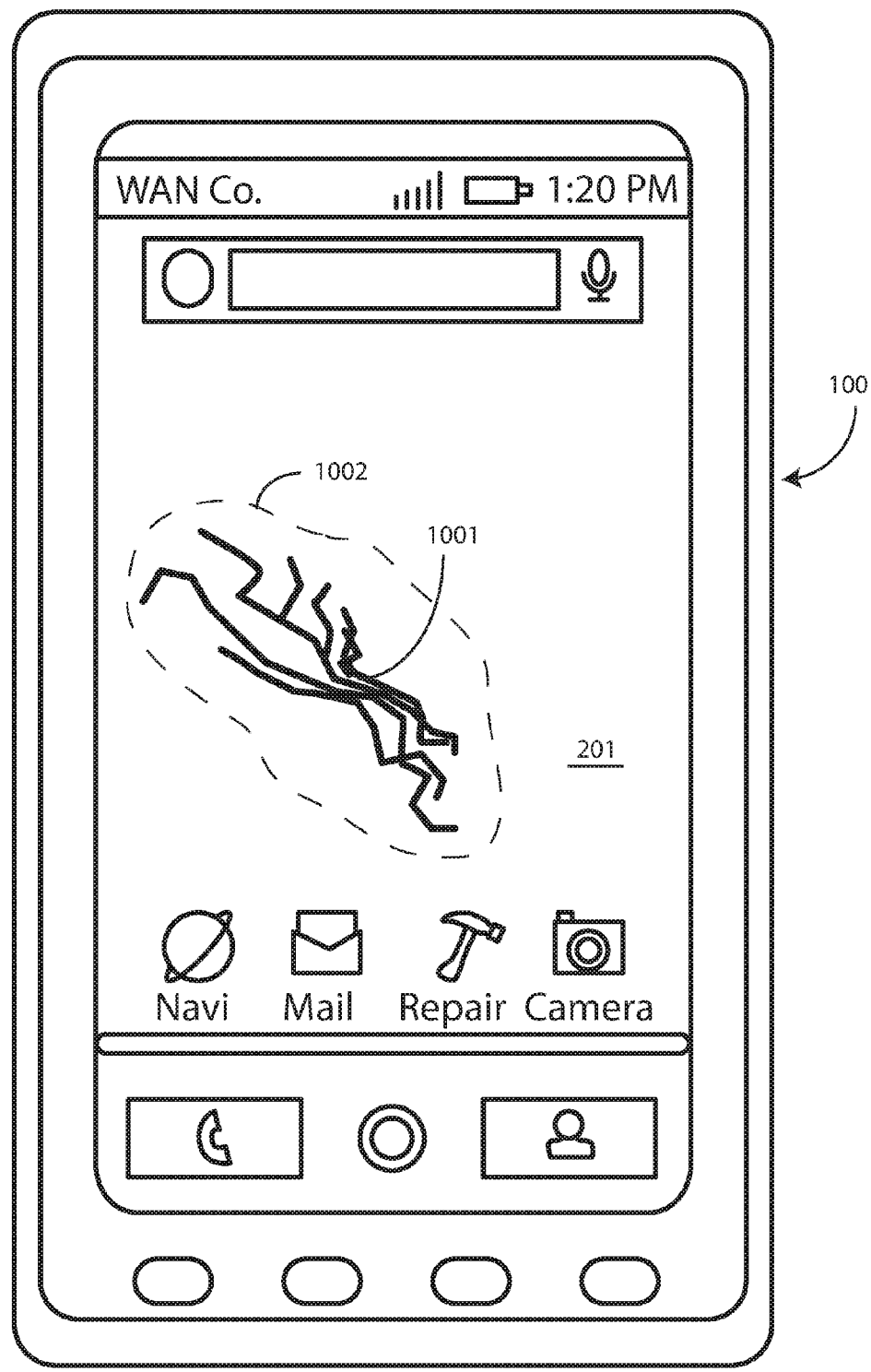
FIG. 10 illustrates an explanatory electronic device in accordance with one or more embodiments of the disclosure where a fascia has suffered deformation along a portion of the fascia.

Turning now to FIG. 10, illustrated therein is the electronic device 100 after deformation 1001 has occurred along a portion 1002 of the fascia 201. In this illustrative embodiment, the deformation 1001 comprises scratches. However, as noted above, the deformation can include bends or breakage as well.

Figure 11:
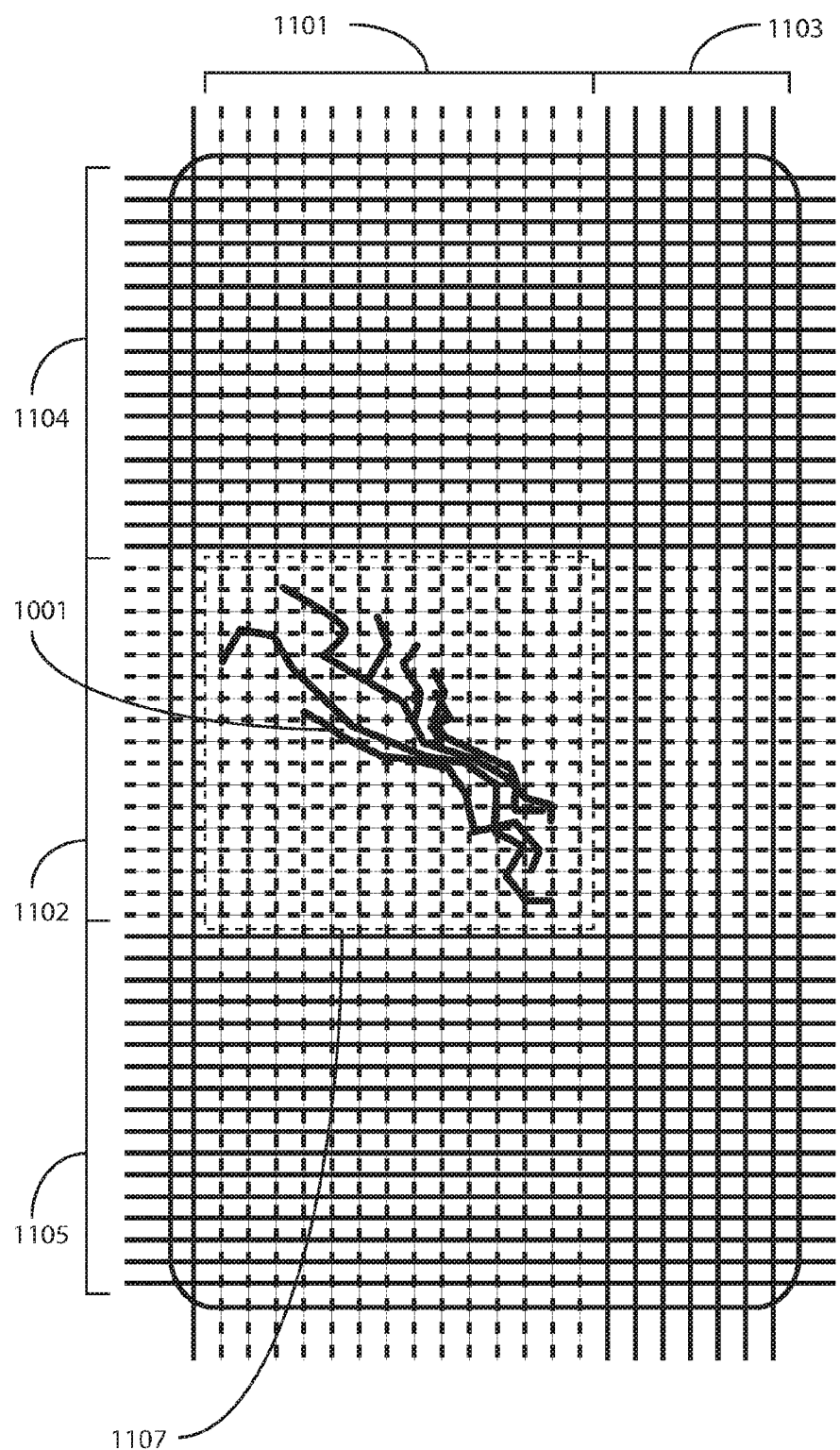
FIG. 11 illustrates one explanatory method for detecting deformation along a portion of the fascia in accordance with one or more embodiments of the disclosure.

In one or more embodiments, the one or more processors (208) of the electronic device 100 are operable to detect this deformation 1001. This detection can be automatic in one embodiment, as illustrated in FIG. 11. In another embodiment, the detection can be in response to user input, as illustrated in FIG. 12.

Beginning with FIG. 11, in one embodiment the damage detection device (905), working with the one or more processors (208), is configured to automatically detect the deformation 1001 to the fascia 201. The damage detection device (905) can also determine the location of the deformation 1001 in one or more embodiments as well.

Illustrating by example, in one embodiment the damage detection device (905) is operable to identify one or more electrode pairs 1101,1102 of the capacitive touch sensor 202 that are inoperable. In this illustration, electrode pairs 1101, 1102 are inoperable due to the deformation 1001 occurring to the fascia (201). However, electrode pairs defined by electrodes 1103 and electrodes 1104,1105 are still operable. The damage detection device (905) can optionally determine a damage perimeter 1107 by detecting which electrodes of electrodes 1103 and electrodes 1104,605 are still operable and are located closest to the deformation 1001.

Figure 12:
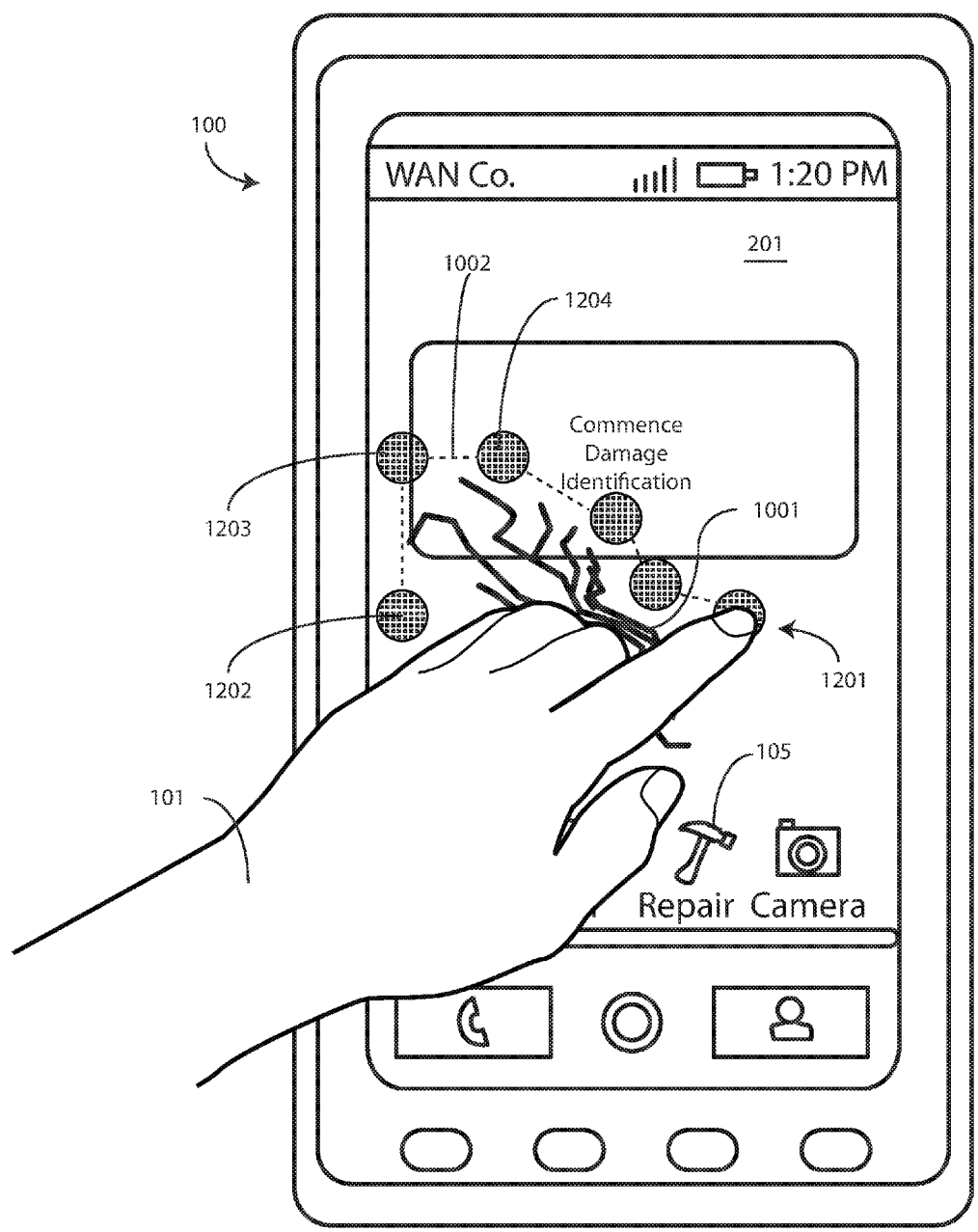
FIG. 12 illustrates another explanatory method for detecting deformation along a portion of the fascia in accordance with one or more embodiments of the disclosure.

By contrast, turning now to FIG. 12, a user 101 has detected the deformation 1001. Accordingly, the user 101 has launched the screen healing application 105 to repair the deformation 1001. In this illustrative embodiment, the one or more processors (208) receive user input 1201 from the touch sensitive user interface of the electronic device 100 demarcating the portion 1002 of the fascia 201 that is deformed.

Figure 13:
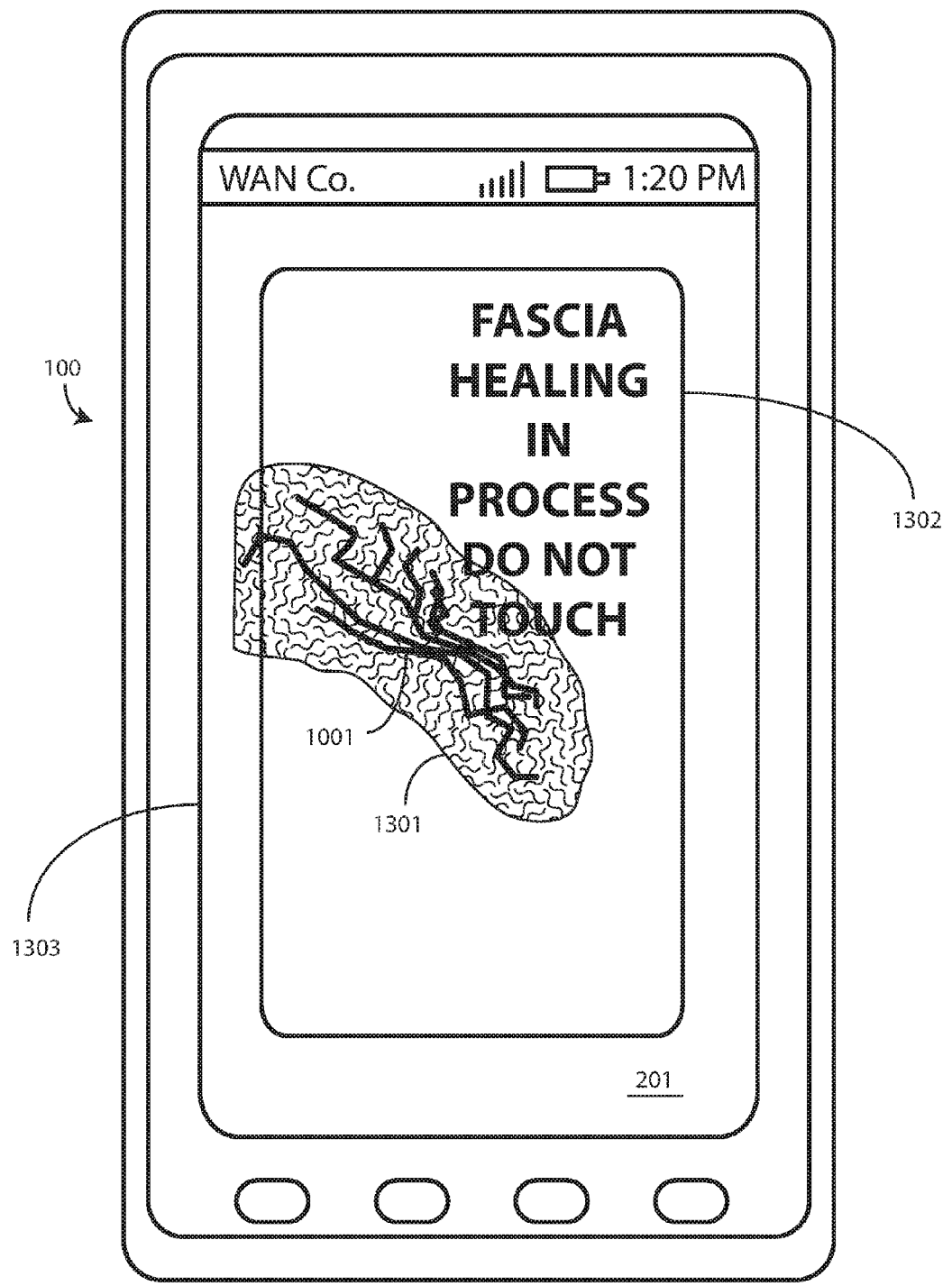
FIG. 13 illustrates one explanatory electronic device in accordance with one or more embodiments of the disclosure when one or more thermal elements selectively apply heat to a shape memory polymer to reverse at least some deformation in accordance with one or more embodiments of the disclosure.
Figure 14:
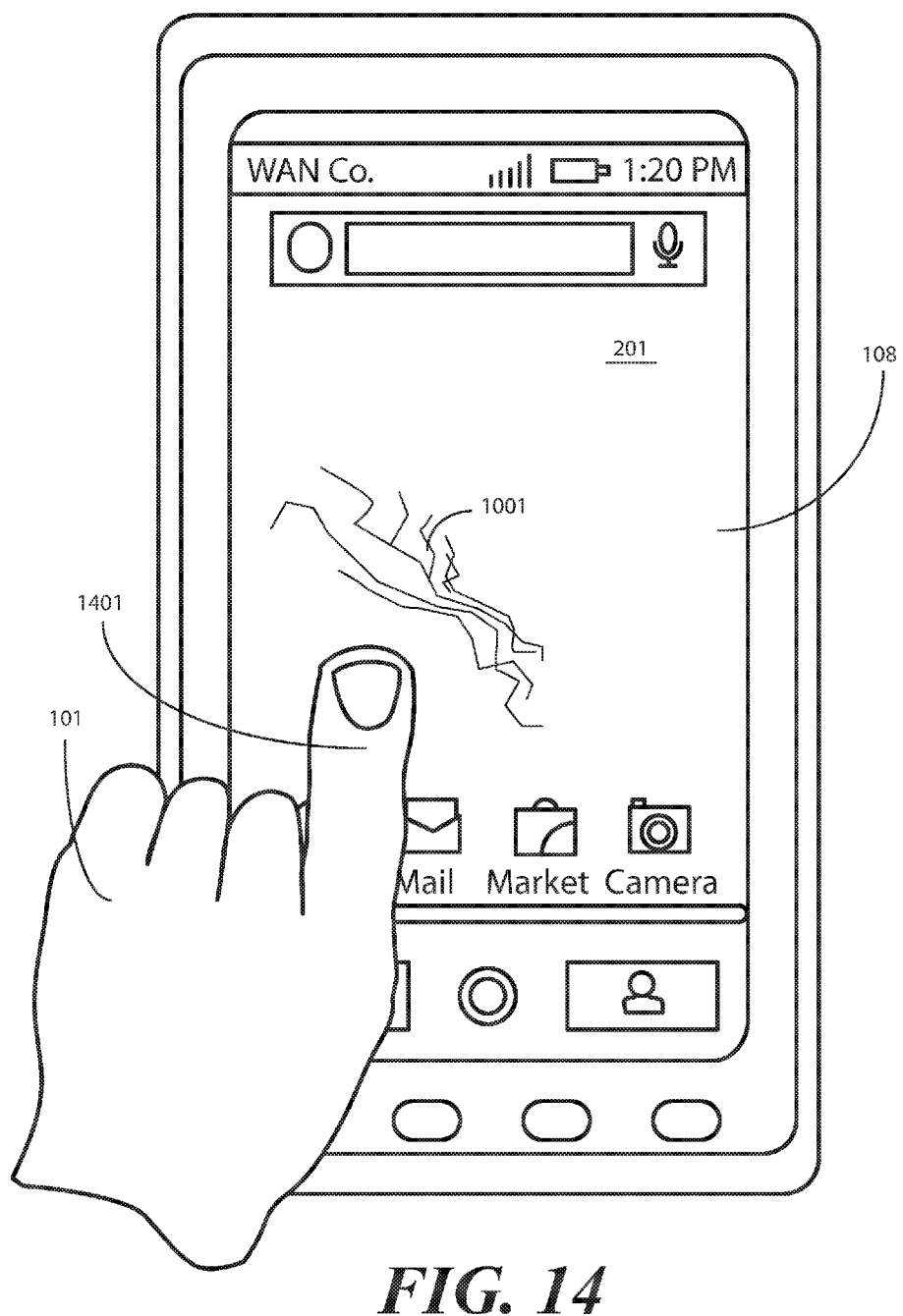
FIG. 14 illustrates one or more method steps in accordance with one or more embodiments of the disclosure.

Regardless of how the deformation 1001 is detected, in one or more embodiments the deformation 1001 is at least partially reversed or repaired by the application of heat to the shape memory polymer of the fascia 201. Turning now to FIG. 13, as shown the one or more processors (208), perhaps in conjunction with the thermal element control (906), cause the one or more thermal elements (908,909,910) to selectively apply heat 1301 to the shape memory polymer of the fascia 201 to reverse or repair at least some of the deformation 1001 as described above. In one embodiment, this application of heat 1301 is by an amount sufficient to cause the shape memory polymer of the fascia 201 to exceed a predefined transition temperature, e.g., the shape memory transition temperature, for at least a predefined duration along the at least a portion of the fascia 201.

As noted above, in one or more embodiments this results in significant heating of the fascia 201, as the shape memory polymer must exceed the shape memory transition temperature, which can be as high as 60 degrees centigrade. This temperature can feel too warm for some users to touch. Accordingly, in one or more embodiments the one or more processors (208) can present indicia 1302 on the user interface 1303 when the one or more thermal elements (908,909,910) selectively apply the heat 1301 to the fascia 201. In one embodiment, the indicia 1302 indicate that the heat 1301 is being applied to the shape memory polymer of the fascia 201. In this example, the indicia 1302 state, "Fascia Healing In Process—Do Not Touch." Other messages and indicia 1302 will be obvious to those of ordinary skill in the art having the benefit of this disclosure.

To ensure that the fascia 201 is not too warm for use by the user (101), in one or more embodiments the one or more processors (208) are operable to cause the one or more thermal elements (908,909,910) to terminate application of the heat 1301 to the shape memory polymer upon detecting, with the touch sensitive interface of the electronic device 100, an object proximately located with the fascia 201. Illustrating by example, and turning now to FIG. 14, the user 101 has touched the fascia 201 before the deformation 1001 has fully healed. This is detected by the touch sensitive user interface of the electronic device that includes the capacitive touch sensor (202) in one embodiment. Accordingly, the one or more processors (208) have terminated the application of heat (1301) so that the fascia 201 so that it will be cool to the touch. Since the display 108 can be touch sensitive, when the user's finger 1401 is removed from the fascia 201, the one or more processors (208) can again cause the one or more thermal elements (908,909,910) to selectively apply heat (1301) to the shape memory polymer of the fascia 201 to reverse or repair at least some of the deformation 1001 as described above with reference to FIG. 13.

Figure 15:
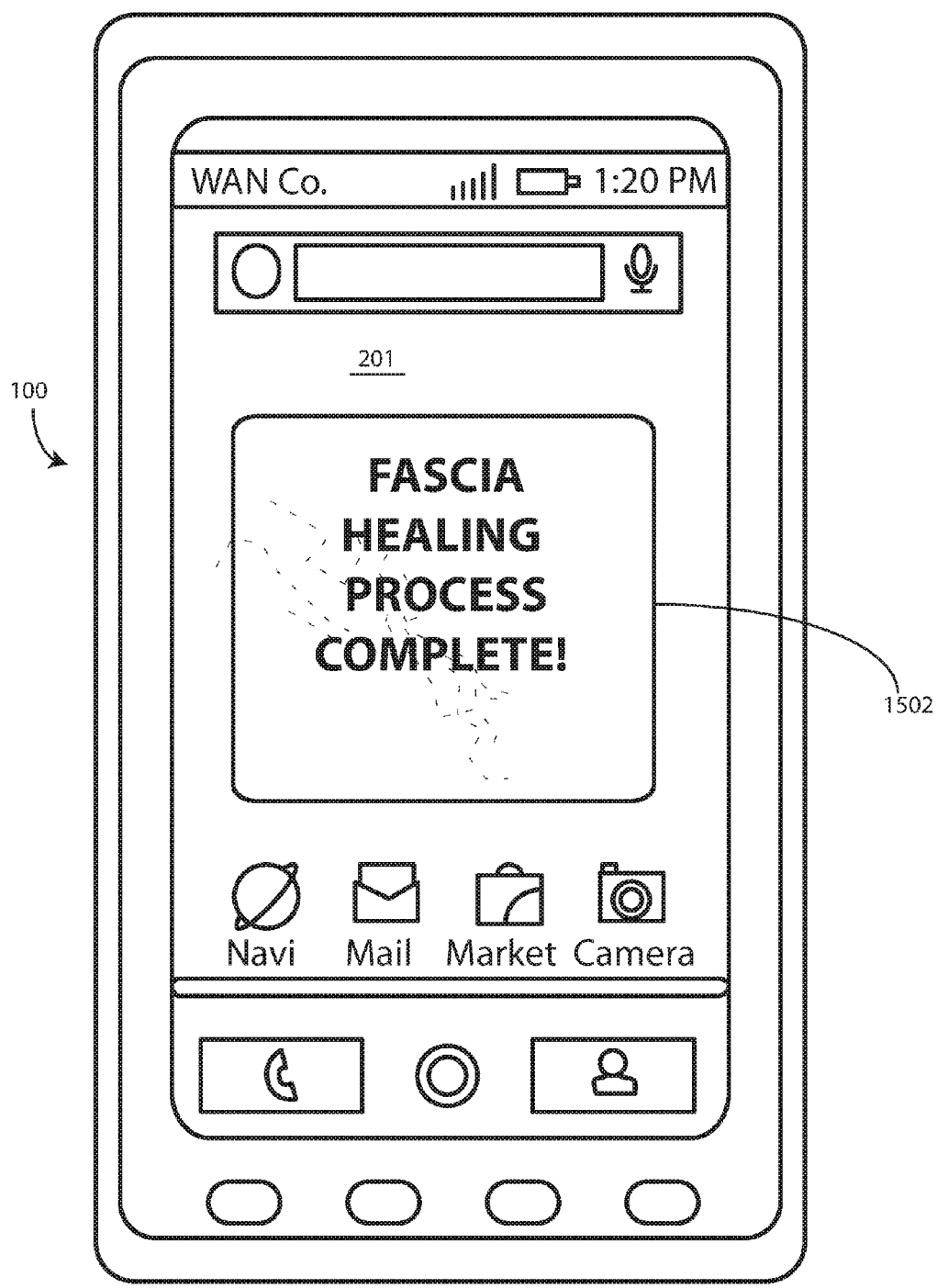
FIG. 15 illustrates one or more method steps in accordance with one or more embodiments of the disclosure.

Turning now to FIG. 15, in one or more embodiments, when the healing is complete, the one or more processors (208) can present indicia 1502 on the user interface when the one or more thermal elements (908,909,910) terminate the application of heat (1301) to the fascia 201. In one embodiment, the indicia 1502 indicate that the self-healing process is complete. In this example, the indicia 1502 state, "Fascia Healing Process Complete." Other messages and indicia 1502 will be obvious to those of ordinary skill in the art having the benefit of this disclosure.

Embodiments of the disclosure contemplate that a user (101) may want to use their electronic device during the day, and may not want to take the time for the one or more thermal elements (908,909,910) to selectively apply the heat (1301) to the fascia 201 to correct the deformation (1001). Accordingly, in one or more embodiments, the one or more processors (208) cause the one or more thermal elements (908,909,910) to selectively apply the heat (1301) to the fascia 201 to correct the deformation (1001) at a time when the user (101) is not using the electronic device 100.

Figure 16:
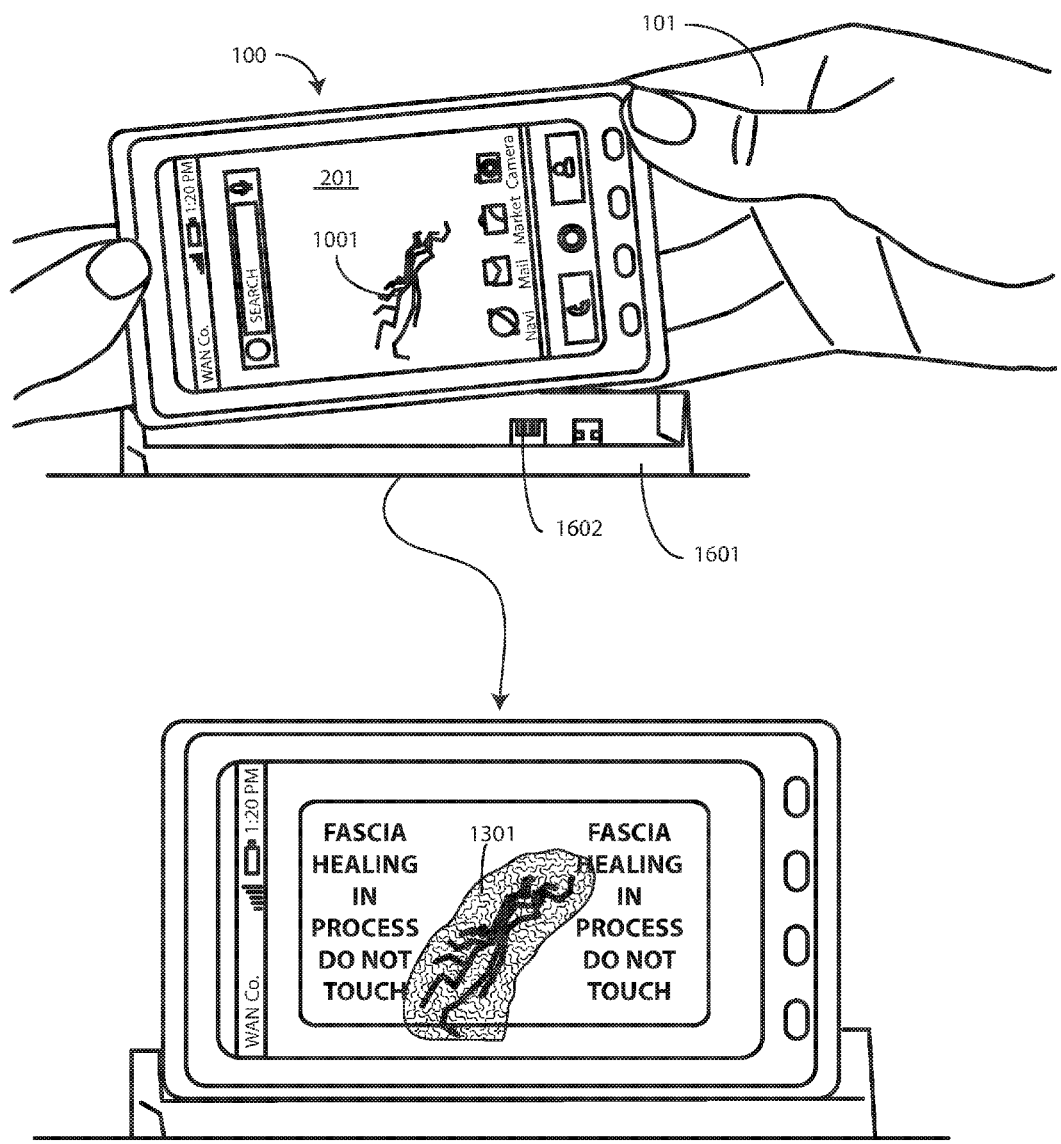
FIG. 16 illustrates one or more method steps in accordance with one or more embodiments of the disclosure.

Turning now to FIG. 16, in one or more embodiments, the electronic device 100 includes a power interface (shown in FIG. 19) to receive energy from a source 1601 coupled to the power interface. In one embodiment, the one or more processors (208) cause the one or more thermal elements (908,909,910) to selectively apply the heat 1301 to the shape memory plastic of the fascia 201 only after the source 1601 is coupled to the power interface. Accordingly, when the user 101 couples the electronic device 100 to the power source 1602, the self-healing operation can commence. This allows the deformation 1001 to heal overnight, such as when the electronic device 100 is coupled to a docking station or alternatively is coupled to a power supply plugged into the wall. Since the electronic device 100 is frequently in a low-power or sleep mode while charging overnight, in one or more embodiments the one or more processors (208) cause the one or more thermal elements (908,909,910) to selectively apply the heat 1301 to the shape memory plastic of the fascia 201 only when the electronic device 100 is in the low power or sleep mode.

Embodiments of the disclosure contemplate that different situations will require different amounts of thermal energy. For example, a small scratch may require only localized heat, which requires less energy than a scratch substantially spanning the fascia 201. Accordingly, in one or more embodiments the amount of heat 1301 applied to the fascia 201 is controllable.

Figure 17:
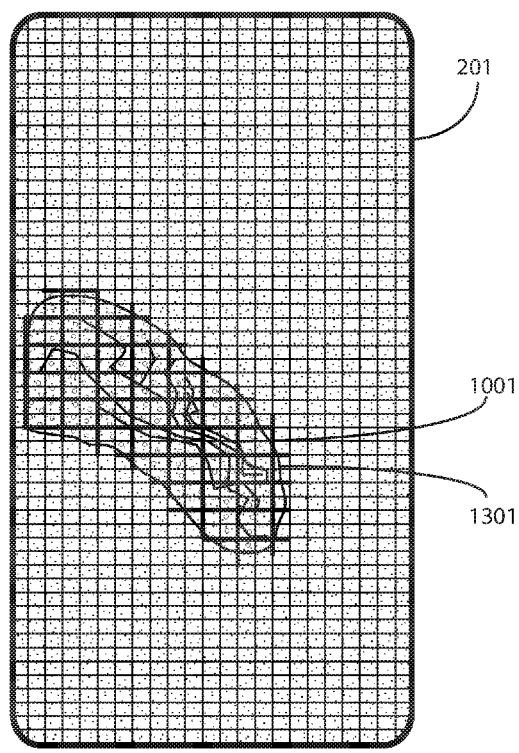
FIG. 17 illustrates one method of selectively applying heat to at least a portion of a fascia with one or more thermal elements of the disclosure.
Figure 18:
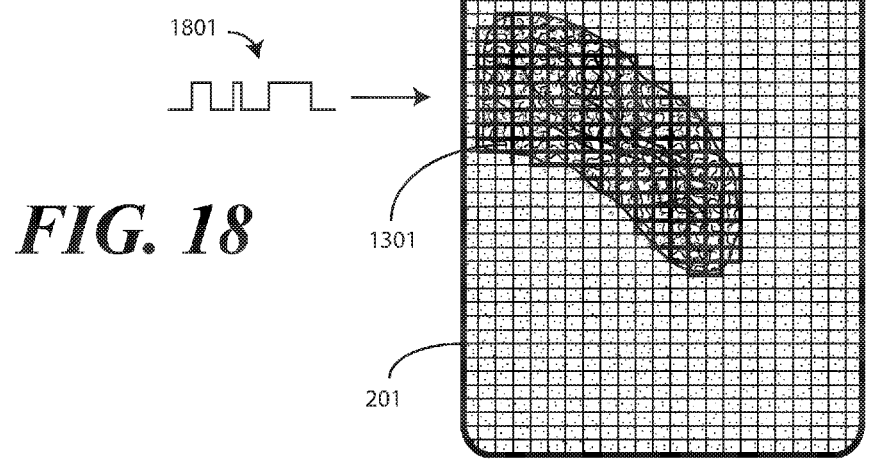
FIG. 18 illustrates another method of selectively applying heat to at least a portion of a fascia with one or more thermal elements of the disclosure.

Turning to FIGS. 17-18, in one or more embodiments the can be controlled in a variety of ways. Illustrating by example, in one embodiment an amount of heat 1301 applied by the one or more thermal elements a function of thermal element density. For example, in FIG. 17 every other thermal element (as indicated by the bold lines) is actuated by the one or more processors (208) along the portion of the fascia 201 where the deformation 1001 exists. This produces a first level of heat 1301.

By contrast, turning to FIG. 18, the one or more processors (208) actuate adjacent thermal elements, which results in a higher density of thermal elements being actuated than was the case in FIG. 17. Accordingly, this results in a second level of heat 1301 that is greater than the first level of heat 1301.

There are other ways to control the amount of heat 1301 applied as well. Illustrating by example, in another embodiment the one or more processors (208) cause the one or more thermal elements to selectively apply the heat 1301 to the shape memory plastic of the fascia 201 in accordance with a duty cycle 1801. By varying the duty cycle 1801, the one or more processors (208) can change the amount of heat 1301 being applied to the shape memory plastic of the fascia 201. While thermal element density and duty cycle 1801 are two examples of how the amount of heat 1301 can be controlled, others will be obvious to those of ordinary skill in the art having the benefit of this disclosure.

Figure 19:
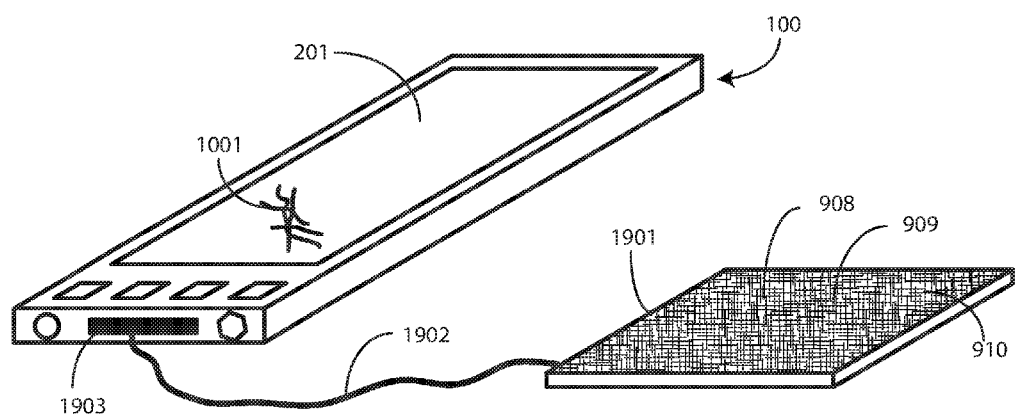
FIG. 19 illustrates one explanatory electronic device and attachment in accordance with one or more embodiments of the disclosure.
Figure 20:
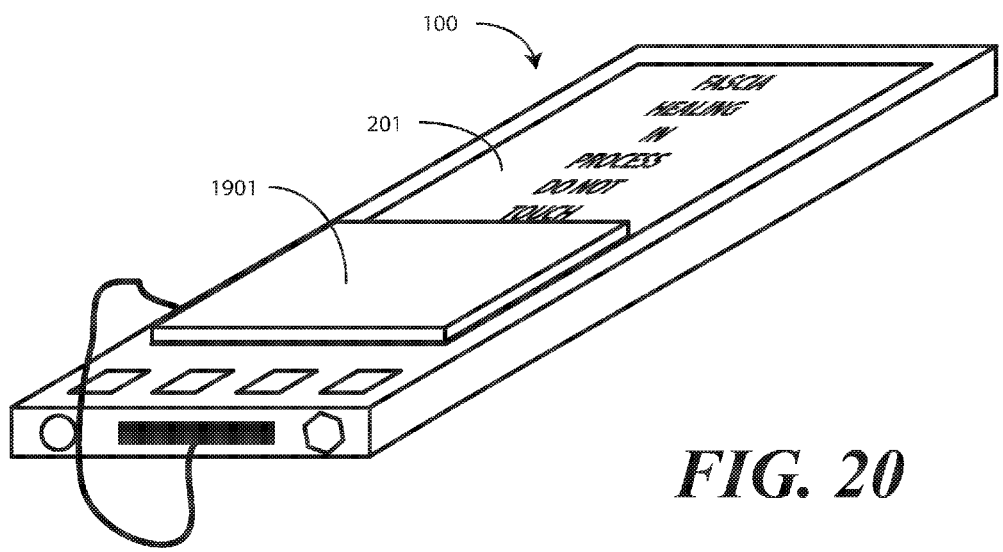
FIG. 20 illustrates one explanatory attachment applying heat with one or more thermal elements to a fascia in accordance with one or more embodiments of the disclosure.

Embodiments of the disclosure additionally contemplate that the thermal elements need not be incorporated into, or disposed adjacent to, the fascia 201 in all applications. Turning now to FIGS. 19-20, illustrated therein is another embodiment where a companion attachment 1901 has thermal elements 908,909,910 disposed along its surface.

In this embodiment, the companion attachment 1901 is configured as an accessory that a user can conveniently attach to, and detach from, the fascia 201 of the electronic device 100. This illustrative companion attachment 1901 includes a power cord 1902 that couples to a power interface 1903. Accordingly, the companion attachment 1901 can draw power from the power interface 1903 of the electronic device 100 to heat the thermal elements 908,909,910. In other embodiments, the companion attachment 1901 can include its own internal power source so as not to draw energy from the energy storage device disposed within the electronic device 100.

As shown in the illustrative embodiment of FIG. 19, the companion attachment 1901 is mechanically configured to be attachable and detachable from the fascia 201 of the electronic device 100. Illustrating by example, in one or more embodiments the companion attachment 1901 may include mechanical arms extending distally from the companion attachment 1901 that are configured to wrap about the electronic device 100. In FIG. 19, the companion attachment 1901 uses gravity to rest against the fascia 201. Regardless of how attachment and detachment occur, where the companion attachment 1901 is selectively attachable to the electronic device 100, the detachability offers a user (101) freedom to use the companion attachment 1901 only when remediation of deformation 1001 is required. In one embodiment the companion attachment 1901 may be optionally stowed on the back of the electronic device 100 or otherwise tethered to the electronic device 100 to prevent it from being misplaced. As shown in FIG. 20, the companion attachment 1901 can be placed along the fascia 201 of the electronic device 100 to at least partially repair or reverse the deformation (1001) as previously described.

Figure 21:
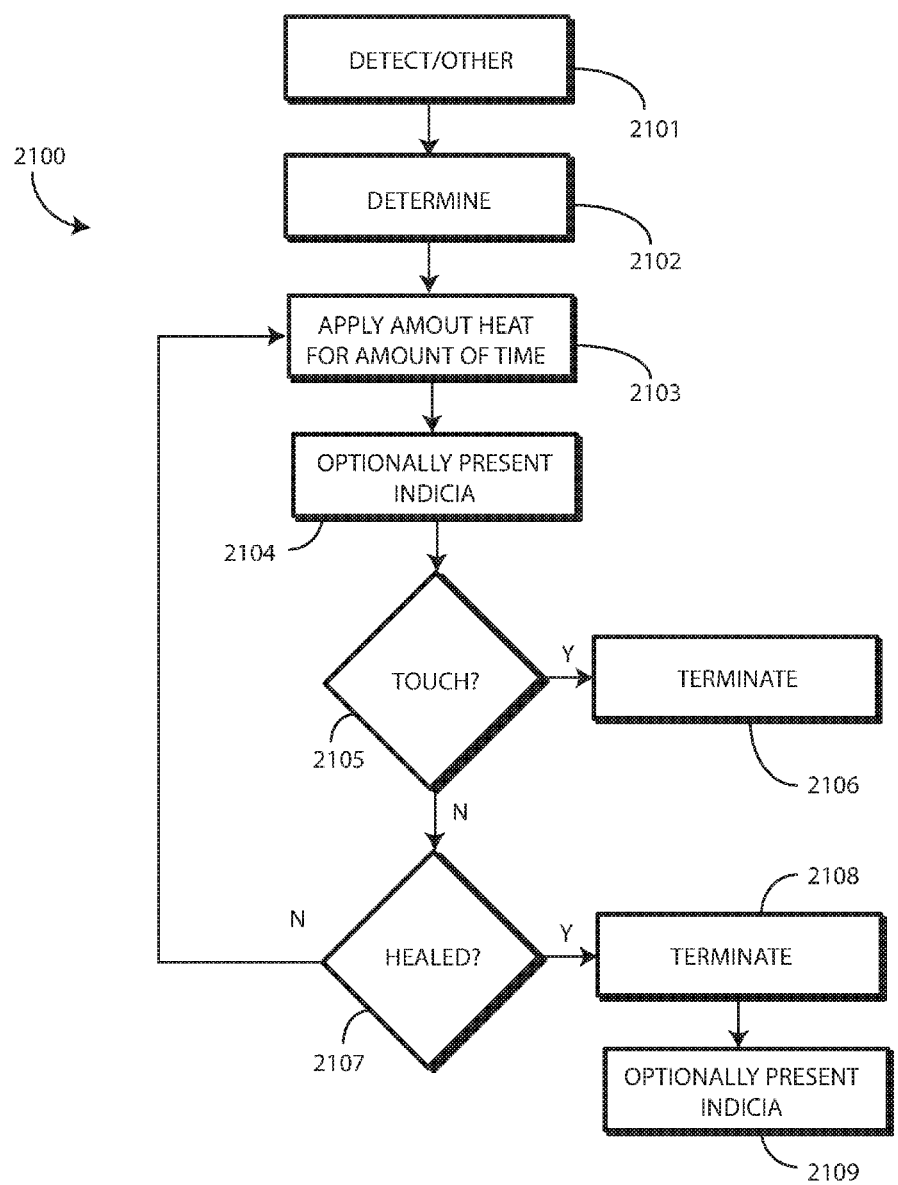
FIG. 21 illustrates one explanatory method in accordance with one or more embodiments of the disclosure.

Turning now to FIG. 21, illustrated therein is one explanatory method 2100 for at least partially repairing or reversing deformation occurring along a fascia of an electronic device in accordance with one or more embodiments of the disclosure. Beginning at step 2101, the method 2100 detects, with one or more processors of the electronic device, a deformation along a portion of a fascia of the electronic device. In one or more embodiments, this detection occurs automatically as previously described. In other embodiments, a user can launch an application or can otherwise deliver user input to the electronic device that indicates deformation has occurred.

At step 2102, the method 2100 can optionally determine along what portions of the fascia the deformation has occurred. As with the deformation detection, in one or more embodiments this determination occurs automatically, such as by determining which capacitive sense touch lines are inoperable. Alternatively, in other embodiments user input can be received to demarcate the portion of the fascia suffering from the deformation.

In one or more embodiments the one or more processors can then cause the one or more thermal elements to selectively apply heat to the shape memory polymer along the at least a portion to reverse at least some of the deformation. Accordingly, at step 2103, the method 2100 selectively applies heat, with one or more thermal elements disposed long the fascia or a companion attachment, to the portion to at least partially repair the deformation of the fascia.

This application of heat occurring at step 2103 can be dependent upon a condition precedent in one or more embodiments. For example, in one embodiment where the electronic device comprises a power interface to receive energy from a source coupled to the power interface, step 2103 can cause the thermal elements to selectively apply the heat to the fascia only after the source is coupled to the power interface. In another embodiment, step 2103 can cause the one or more thermal elements to selectively apply the heat to the shape memory plastic when the electronic device is in a low power or sleep mode.

The amount of heat applied at step 2103 can vary as well. In one embodiment, step 2103 causes the thermal elements to selectively apply the heat to the shape memory plastic in accordance with a varying duty cycle. In another embodiment, the amount of heat can be applied as a function of thermal element density. Other methods of controlling the amount of heat will be obvious to those of ordinary skill in the art having the benefit of this disclosure.

At step 2104, the method 2100 can optionally present, on a user interface of the electronic device, indicia indicating the selectively applying the heat by the one or more thermal elements is occurring. Illustrating by example, the indicia may comprise a message stating, "Fascia Healing In Process—Do Not Touch." Other messages and indicia will be obvious to those of ordinary skill in the art having the benefit of this disclosure.

At optional decision 2105, the method 2100 can determine whether a person or other object touches the fascia of the electronic device. In one embodiment, when this occurs, the method 2100 can terminate the selective application of heat upon detecting an object proximately located with the fascia at step 2106.

At decision 2107, the method 2100 can determine whether the deformation has been reversed or repaired to its fullest extent. In one or more embodiments, this decision 2107 comprises determining whether the one or more thermal elements has selectively applied the heat by an amount sufficient to cause the shape memory plastic of the fascia to exceed a predefined transition temperature for at least a predefined duration along the portion of the fascia affected by the deformation. Where it has, the method 2100 can terminate the selective application of heat at step 2108. The method 2100 can optionally present indicia indicating that repair is complete at step 2109. In one or more embodiments, the indicia may comprise a message stating, "Fascia Healing Process Complete." Other messages and indicia will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a fascia comprising a shape memory polymer;
    one or more thermal elements disposed adjacent to the fascia; and
    one or more processors operable with the one or more thermal elements, the one or more processors:
        detecting deformation along at least a portion of the fascia;
        causing the one or more thermal elements to selectively apply heat to the shape memory polymer along the at least a portion to reverse at least some of the deformation; and
        presenting a message on the user interface when the one or more thermal elements selectively apply the heat to the shape memory polymer, the message indicating that the heat is being applied to the shape memory polymer;
    the one or more processors further causing the one or more thermal elements to selectively apply the heat to the shape memory polymer when the electronic device is in a low power or sleep mode.

2. The electronic device of claim 1, further comprising a touch sensitive user interface disposed beneath the fascia, the one or more processors further to receive user input from the touch sensitive user interface demarcating the at least a portion.

3. The electronic device of claim 1, further comprising a touch sensitive interface, the one or more processors to cause the one or more thermal elements to terminate application of the heat to the shape memory polymer upon detecting, with the touch sensitive interface, an object proximately located with the fascia.

4. The electronic device of claim 1, the message indicating that the fascia not be touched.

5. The electronic device of claim 1, further comprising a power interface to receive energy from a source coupled to the power interface, the one or more processors to cause the one or more thermal elements to selectively apply the heat to the shape memory polymer only after the source is coupled to the power interface.

6. The electronic device of claim 1, the one or more processors further receiving a user demarcation identifying a location of the deformation.

7. The electronic device of claim 1, the one or more processors to cause the one or more thermal elements to selectively apply the heat to the shape memory polymer in accordance with a varying duty cycle.

8. The electronic device of claim 1, an amount of heat applied by the one or more thermal elements occurring as a function of thermal element density.

9. The electronic device of claim 1, the deformation comprising one or more of:
    scratches along the fascia;
    breakage of the fascia; or
    bending of the fascia.

10. The electronic device of claim 1, the one or more thermal elements to selectively apply the heat by an amount sufficient to cause the shape memory polymer to exceed a predefined transition temperature for at least a predefined duration along the at least a portion of the fascia.

11. The electronic device of claim 10, the one or more thermal elements comprising a matrix of optically transparent resistive electrodes.

12. The electronic device of claim 11, one or more optically transparent resistive electrodes having an impedance of between 200 and 1000 ohms, inclusive.

13. The electronic device of claim 11, further comprising a pellucid substrate disposed adjacent to the fascia, the matrix of optically transparent resistive electrodes disposed along the pellucid substrate.

14. The electronic device of claim 11, the matrix of optically transparent resistive electrodes comprising an interlaced matrix of optically transparent resistive electrodes.

15. The electronic device of claim 10, the one or more thermal elements comprising a capacitive touch-sensitive film.

16. The electronic device of claim 1, further comprising a companion attachment configured to selectively couple to the electronic device, the companion attachment comprising the one or more thermal elements.

17. A method, in an electronic device, comprising:
- automatically detecting, with one or more processors of the electronic device, a deformation along a portion of a fascia of the electronic device by identifying one or more inoperable electrode pairs of a capacitive touch sensor of the electronic device, the fascia comprising a shape memory polymer; and
- selectively applying heat, with one or more thermal elements disposed long the fascia and operable with the one or more processors, to the portion to at least partially repair the deformation of the fascia.

18. The method of claim 17, further comprising receiving, from a touch sensitive user interface operable with the one or more processors, user input demarcating the portion.

19. The method of claim 18, further comprising presenting, on the touch sensitive user interface, a message indicating the selectively applying the heat by the one or more thermal elements is occurring.

20. The method of claim 17, further comprising terminating the selectively applying upon detecting an object proximately located with the fascia.

* * * * *